(12) United States Patent
Siomina et al.

(10) Patent No.: US 9,331,827 B2
(45) Date of Patent: May 3, 2016

(54) ENHANCED RECEIVER CONFIGURATION ADAPTIVE TO CYCLIC PREFIX CONFIGURATION

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/400,659

(22) PCT Filed: May 14, 2013

(86) PCT No.: PCT/SE2013/050537
§ 371 (c)(1),
(2) Date: Nov. 12, 2014

(87) PCT Pub. No.: WO2013/172772
PCT Pub. Date: Nov. 21, 2013

(65) Prior Publication Data
US 2015/0131749 A1 May 14, 2015

Related U.S. Application Data

(60) Provisional application No. 61/646,522, filed on May 14, 2012, provisional application No. 61/646,539, filed on May 14, 2012, provisional application No. 61/646,534, filed on May 14, 2012.

(51) Int. Cl.
*H03D 1/04* (2006.01)
*H03D 1/06* (2006.01)
(Continued)

(52) U.S. Cl.
CPC ............. *H04L 5/0032* (2013.01); *H04J 11/005* (2013.01); *H04L 27/2605* (2013.01); *H04L 27/2607* (2013.01); *H04L 27/2647* (2013.01)

(58) Field of Classification Search
CPC ............ H04L 5/0032; H04L 27/2607; H04L 27/2605; H04L 27/2647; H04L 5/003; H04L 5/0035; H04L 5/0037; H04L 5/0039; H04J 11/005; H04J 11/0023; H04J 11/0056; H04J 11/0059
USPC .................... 375/346, 260; 455/67.13, 456.1; 370/67.13

See application file for complete search history.

(56) References Cited

U.S. PATENT DOCUMENTS

2009/0111385 A1* 4/2009 Choi et al. .................. 455/67.13
2010/0067418 A1* 3/2010 Parkvall ................ H04W 68/02
                                                  370/311

(Continued)

FOREIGN PATENT DOCUMENTS

WO    WO 2011/037501 A1    3/2011

OTHER PUBLICATIONS

International Search Report for International Application No. PCT/SE2013/050537 mailed Aug. 20, 2013, 3 pages.

(Continued)

*Primary Examiner* — Phuong Phu
(74) *Attorney, Agent, or Firm* — Myers Bigel & Sibley, P.A.

(57) ABSTRACT

A method in a first radio node is described for adapting a receiver type in the first radio node. The first radio node includes a first and a second receiver types. The first radio node is included in a wireless communications network, which further includes a second radio node and at least one third radio node. The method includes determining a Cyclic Prefix, CP, length of at least one radio signal transmitted by the second radio node, and a CP length of at least one radio signal transmitted by the at least one third radio node. The first node then adapts, the receiver type to be one of the first type and the second types. This is done based on a relation between the CP length of the radio signal transmitted by the second radio node, and the CP length of the radio signal transmitted by the third radio node.

20 Claims, 14 Drawing Sheets

Various interference scenarios in heterogeneous deployments.

(51) Int. Cl.
  *H03K 5/01*  (2006.01)
  *H03K 6/04*  (2006.01)
  *H04B 1/00*  (2006.01)
  *H04L 1/00*  (2006.01)
  *H04L 25/08*  (2006.01)
  *H04L 5/00*  (2006.01)
  *H04J 11/00*  (2006.01)
  *H04L 27/26*  (2006.01)

(56) References Cited

U.S. PATENT DOCUMENTS

2010/0279707 A1\* 11/2010 Fischer et al. ............ 455/456.1
2012/0033589 A1\* 2/2012 Zheng ........................... 370/280

OTHER PUBLICATIONS

Written Opinion of the International Searching Authority for International Application No. PCT/SE2013/050537 mailed Aug. 20, 2013, 9 pages.
Mediatek Inc: "Cell search under 9dB cell selection bias", 3GPP TSG-RAN WG1 Meeting #68bis; R1-121168 Jeju, Korea, Mar. 26-30, 2012; Mobile Competence Centre; 650, Route Des Lucioles; F-06921 Sophia-Antipolis Cedex; France, XP050600036; 2 pages.
New Postcom: "Consideration of remaining issues for 9dB bias", 3GPP TSG RAN WG1 Meeting #68bis; R1-121346 Jeju, Korea, Mar. 26-30, 2012; Mobile Competence Centre; 650, Route Des Lucioles; F-06921 Sophia-Antipolis Cedex; France, XP050599635; 4 pages.
Ericsson et al: "On CP length in practical network deployments", 3GPP TSG-RAN WG4 Meeting #62bis; R4-121906 Jeju Island, Korea, Mar. 26-30, 2012; Mobile Competence Centre; 650, Route Des Lucioles; F-06921 Sophia-Antipolis Cedex; France, XP050613200; 2 pages.
Motorola: "Orthogonal PRS transmissions in mixed CP deployments using MBSFN subframes", 3GPP TSG RAN1 #58bis; R1-093975 Miyazaki, Japan, Aug. 12-16, 2009; Mobile Competence Centre; 650, Route Des Lucioles; F-06921 Sophia-Antipolis Cedex; France, XP050388465; 3 pages.
Ericsson et al: "On CP length in FeICIC-specific requirements", 3GPP TSG-RAN WG4 Meeting #63; R4-123055 Prague, Czech Republic, May 21-25, 2012; Mobile Competence Centre; 650, Route Des Lucioles; F-06921 Sophia-Antipolis Cedex; France, XP050614251; 3 pages.
Huawei et al: "Discussion on the CP length assumption for Hetnet" 3GPP TSG-RAN WG4 Meeting #63; R4-122840 Prague, Czech Republic, May 21-25, 2012; Mobile Competence Centre; 650, Route Des Lucioles; F-06921 Sophia-Antipolis Cedex; France, XP050614107; 2 pages.
3GPP TS 36.331 V11.3.0 (Mar. 2013) 3$^{rd}$ Generation Partnership Project; Technical Specification Group Radio Access Network; Evolved Universal Terrestrial Radio Access (E-UTRA); Radio Resource Control (RRC); Protocol specification (Release 11) ; 650, Route Des Lucioles; F-06921 Sophia-Antipolis Cedex; France.

\* cited by examiner

Various interference scenarios in heterogeneous deployments.

ENHANCED RECEIVER CONFIGURATION ADAPTIVE TO CYCLIC PREFIX CONFIGURATION

CROSS REFERENCE TO RELATED APPLICATION

This application is a 35 U.S.C. §371 national stage application of PCT International Application No. PCT/SE2013/050537, filed on 14 May 2013, which itself claims the benefit of U.S. provisional Patent Application No. 61/646,522, filed 14 May 2012, U.S. Provisional Patent Application No. 61/646,539, filed 14 May 2012, and U.S. Provisional Patent Application No. 61/646,534, filed 14 May 2012, the disclosures and contents of all of which are incorporated by reference herein in their entirety. The above-referenced PCT International Application was published in the English language as International Publication No. WO 2013/172772 A1 on 21 Nov. 2013.

TECHNICAL FIELD

The present invention relates to methods and apparatus for communicating in a wireless communication system.

BACKGROUND

Interference Cancellation/Mitigation Capable Receivers

In Universal Mobile Telecommunications System/High-Speed Downlink Packet Access (UMTS/HSDPA (several interference aware receivers have been specified for the User Equipment (UE). They are termed as 'enhanced receivers' as opposed to the baseline receiver (rake receiver). The UMTS enhanced receivers are referred to as enhanced receiver type 1 (with two-branch receiver diversity), enhanced receiver type 2 (with single-branch equalizer), enhanced receiver type 3 (with two branch receiver diversity and equalizer) and enhanced receiver type 3i (with two branch receiver diversity and inter-cell interference cancellation capability). The new receivers can be used to improve performance, e.g., in terms of throughput and/or coverage.

In Long Term Evolution Release-10 (LTE Rel-10), enhanced interference coordination techniques have been developed to mitigate potentially high interference, e.g., in a cell range expansion zone, while providing the UE with time-domain measurement restriction information. Further, for LTE Release-11 (LTE Rel-11), advanced receivers based on Minimum Mean Square Error-Interference Rejection Combining (MMSE-IRC) with several covariance estimation techniques and interference-cancellation-capable receivers are being currently studied. In future even more complex advanced receivers such as Minimum Mean Square Error-Successive Interference Cancellation (MMSE-SIC), which is capable of performing nonlinear subtractive-type interference cancellation, can be used to further enhance system performance.

Such techniques generally may benefit all deployments where relatively high interference of one or more signals is experienced when performing measurements on radio signals or channels transmitted by radio nodes or devices, but are particularly useful in heterogeneous deployments.

However, these techniques involve also additional complexity, e.g., may require more processing power and/or more memory. Due to these factors such receiver may be used by the UE for mitigating interference on specific signals or channels. For example a UE may apply an interference mitigation or cancellation technique only on data channel. In another example a more sophisticated UE may apply interference mitigation on data channel as well as on one or two common control signals; examples of common control signals are reference signal, synchronization signals etc.

It should be noted that the terms interference mitigation receiver, interference cancellation receiver, interference suppression receiver, interference rejection receiver, interference aware receiver, interference avoidance receiver etc are interchangeably used but they all belong to a category of an advanced receiver or an enhanced receiver. All these different types of advanced receiver improve performance by fully or partly eliminating the interference arising from at least one interfering source. The interfering source is generally the strongest interferer(s), which are signals from the neighbouring cells when the action is performed in the UE. Therefore a more generic term, 'enhanced receiver', which covers all variants of advanced receiver, is used hereinafter. Further, the corresponding interference handling techniques (e.g., interference cancellation, interference suppression, puncturing or interference rejection combining) for enhanced receivers are termed 'enhanced receiver technique' herein.

Heterogeneous Deployments

In 3rd Generation Partnership Project (3GPP), heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e. small geographical areas with a higher user density and/or higher traffic intensity where installation of pico nodes can be considered to enhance performance. Heterogeneous deployments may also be viewed as a way of densifying networks to adopt for the traffic needs and the environment. However, heterogeneous deployments bring also challenges for which the network has to be prepared to ensure efficient network operation and superior user experience. Some challenges are related to the increased interference in the attempt to increase small cells associated with low-power nodes, aka cell range expansion; the other challenges are related to potentially high interference in uplink due to a mix of large and small cells.

According to 3GPP, heterogeneous deployments consist of deployments where low power nodes are placed throughout a macro-cell layout. The interference characteristics in a heterogeneous deployment can be significantly different than in a homogeneous deployment, in downlink or uplink or both.

Examples hereof with Closed Subscriber Group (CSG) cells are given in FIG. 1, where in case (a), a macro user with no access to the CSG cell will be interfered by the Home enhanced Node B (HeNB), in case (b) a macro user causes severe interference towards the HeNB and in case (c), a CSG user is interfered by another CSG HeNB. Heterogeneous deployments, however, are not limited to those with CSG involved.

Another example is illustrated in FIG. 2, where the need for enhanced Inter-Cell Interference Coordination (ICIC) techniques for DownLink (DL) is particularly crucial when the cell assignment rule diverges from the Reference Signal Received Power (RSRP)-based approach, e.g. towards pathloss- or pathgain-based approach, sometimes also referred to as the cell range expansion when adopted for cells with a transmit power lower than neighbor cells. In FIG. 2, the cell range expansion of a pico cell is implemented by means of a parameter $\Delta$. The pico cell is expanded without increasing its power, just by changing the reselection threshold, e.g., UE selects cell of pico Base Station (BS) as the serving cell when $RSRP_{pico} + \Delta \geq RSRP_{macro}$, where $RSRP_{macro}$ is the received signal strength measured for the cell of macro BS and RSRP$_{pico}$ is the signal strength measured for the cell of pico BS.

Transmit Patterns and Measurement Patterns for Enhanced ICIC (eICIC)

To facilitate measurements in the extended cell range, i.e., where high interference is expected, the standard specifies Almost Blank Subframe (ABS) patterns for eNodeBs and restricted measurement patterns for UEs. A pattern that can be configured for eICIC is a bit string indicating restricted and unrestricted subframes characterized by a length and periodicity, which are different for Frequency Division Duplex (FDD) and Time Division Duplex (TDD) (40 subframes for FDD and 20, 60 or 70 subframes for TDD). Only DL patterns have been so far specified for interference coordination in 3GPP, although patterns for Uplink (UL) interference coordination are also known in prior art.

ABS pattern is a transmit pattern at a radio node transmitting radio signals; it is cell-specific and may be different from the restricted measurement patterns signaled to the UE. In a general case, ABS are low-power and/or low-transmission activity subframes. ABS patterns may be exchanged between eNodeBs via X2, but these patterns are not signalled to the UE, unlike the restricted measurement patterns.

Restricted measurement patterns (more precisely, "time domain resource restriction patterns" [TS 36.331]) are configured to indicate to the UE a subset of subframes for performing measurements, typically in lower interference conditions, where the interference may be reduced e.g. by means of configuring Multimedia Broadcast Single Frequency Network (MBSFN) subframes or ABS subframes at interfering eNodeBs.

Restricted measurement patterns may, however, be also configured for UEs with good interference conditions, i.e., receiving a measurement pattern may be not necessarily an indication of expected poor signal quality. For example, a measurement pattern may be configured for UE in the cell range expansion zone where typically high interference is expected, but a measurement pattern may also be configured for UEs located close to the serving base station where the signal quality is typically good which may be for the purpose of enabling a higher-rank transmission modes (e.g., rank-two transmissions).

Restricted measurement patterns are in general UE-specific, although it is known in prior art that such patterns may be broadcasted or multicasted. Three patterns are currently specified in the standard to enable restricted measurements:
  Serving-cell pattern for Radio Link Monitoring (RLM) and Radio Resource Management (RRM) measurements,
  Neighbor-cell pattern for RRM measurements,
  Serving-cell pattern for Channel State Information (CSI) measurements.

Transmit patterns and measurement patterns are means for coordinating inter-cell interference in wireless network and improve measurement performance. Alternatively or in addition to inter-cell interference coordination techniques, measurement performance may also be improved by using more advanced receiver techniques, e.g., interference suppression or interference cancellation techniques.

Large-Scale Channel and Propagation Properties

Some examples of large-scale channel/propagation properties and environment characteristics are:
  Delay spread
  Doppler spread
  Doppler shift (aka frequency shift)
  Average received power
  Receive timing or propagation time Signals may arrive via different propagation paths. Receiving two signals with very different any of the above properties is typically more complex and resource demanding, e.g., in terms of memory, measurement time, sampling, processing time and resources (e.g., number of Fast Fourier Transforms (FFTs) in parallel), power, etc.

Transmit signal configuration (e.g., physical time and/or frequency resource configuration, mapping to transmit time and/or frequency resources, transmit power, etc.) is typically done to account for the properties above, e.g., extended cyclic prefix may be configured in cells with a large delay spread.

Cyclic Prefix

Cyclic prefix (CP) is a prefix of a symbol with a repetition of the end of the symbol. Although the receiver is typically configured to discard the CP samples, the CP often serves two purposes:
  As a guard interval, it eliminates the inter-symbol interference from the previous symbol; and
  As a repetition of the end of the symbol, it allows the linear convolution of a frequency-selective multipath channel to be modelled as circular convolution, which in turn may be transformed to the frequency domain using a discrete Fourier transform. This approach allows for simple frequency-domain processing, such as channel estimation and equalization.

In order for the CP to be effective (i.e. to serve its aforementioned objectives), the length of the CP must be at least equal to the length of the multipath channel. Although the concept of CP has been traditionally associated with Orthogonal Frequency Division Multiplexing (OFDM) systems, the CP is now also used in single carrier systems to improve the robustness to multipath.

Extended CP length may be configured in cells with a large delay spread. Some examples of scenarios where the received signal could have components with longer delay, i.e., where the extended CP may be useful, are as follows:
  large cells,
  rural environment, mountain environments, etc.,
  receiving signals from far-away cells (e.g., with positioning when many cells need to be detected),
  network deployments with repeaters or relays,
  indoor scenarios with many reflections and propagations paths, and
  scenarios when MBSFN subframes are configured (with or without Multimedia Broadcast and Multicast Service (MBMS) traffic), etc.

Cyclic Prefix in LTE

In LTE, normal CP or extended CP may be used, and the CP may be configured separately for DL and UL, i.e., CP in DL may be different from that of the CP in UL. The CP length determines the number of symbols in a slot, duration of transmitted signal/channels, and signal/channel mapping to time-frequency resource grid.

The DL transmission scheme is based on conventional OFDM using a cyclic prefix. The OFDM sub-carrier spacing is $\Delta f=15$ kHz. 12 consecutive sub-carriers during one slot correspond to one downlink Resource Block (RB). In the frequency domain, the number of resource blocks, $N_{RB}$, can range from $N_{RB-min}=6$ to $N_{RB-max}=110$ per carrier or per cell in case of CA.

In addition there is also a reduced sub-carrier spacing $\Delta f_{low}=7.5$ kHz, only for MBMS-dedicated cell.

In the case of 15 kHz sub-carrier spacing there are two cyclic-prefix lengths, corresponding to seven and six OFDM symbols per slot respectively.
  Normal cyclic prefix: $T_{CP}=160 \times Ts$ (OFDM symbol #0), $T_{CP}=144 \times Ts$ (OFDM symbol #1 to #6), Extended cyclic prefix: $T_{CP-e}=512\times T_s$ (OFDM symbol #0 to OFDM symbol #5),
where $T_s=1/(2048\times\Delta f)$.

In case of 7.5 kHz sub-carrier spacing, there is only a single cyclic prefix length $T_{CP-low}=1024\times T_s$, corresponding to 3 OFDM symbols per slot.

For UL transmission scheme, there are two CP lengths defined: normal CP and extended CP corresponding to seven and six Single-Carrier Frequency Division Multiple Access (SC-FDMA) symbol per slot, respectively.

Normal cyclic prefix: $T_{CP}=160\times T_s$ (SC-FDMA symbol #0), $T_{CP}=144\times T_s$ (SC-FDMA symbol #1 to #6), Extended cyclic prefix: $T_{CP-e}=512\times T_s$ (SC-FDMA symbol #0 to SC-FDMA symbol #5).

Existing Signalling of the CP Information

For UL, the CP information may be sent to the UE (via Radio Resource Control (RRC) protocol) in a higher-layer parameter UL-CyclicPrefixLength comprised in Information Element (IE) RadioResourceConfigCommonSIB (e.g., in System Information Block 2 (SIB2)) and/or IE RadioResourceConfigCommon (e.g., in RRCConnectionReconfiguration message), which are used to specify common radio resource configurations in the system information and in the mobility control information, respectively, e.g., the random access parameters and the static physical layer parameters.

The information about whether normal or extended CP is used in DL and UL may also be exchanged between eNodeBs over X2 interface in Served Cell Information IE, but only as a part of TDD information and more specifically, as a part of the Special Subframe Info IE.

The CP length information may also be signalled to the UE in the Observed Time Difference Of Arrival (OTDOA) assistance information provided by the positioning node Evolved Serving Mobile Location Centre (E-SMLC) over LTE Positioning Protocol (LPP) for the OTDOA reference cell and also for all neighbour cells which have CP length different from that of the reference cell. Note also that the CP length of Cell-specific Reference Signal (CRS) may be different from that of the Positioning Reference Signals (PRS), e.g., the current standard says:

cpLength

This field specifies the cyclic prefix length of the neighbour cell PRS if PRS are present in this neighbor cell, otherwise this field specifies the cyclic prefix length of CRS in this neighbor cell.

The PRS CP length information may also be signaled from eNodeB to E-SM LC provided in the IE OTDOA Cell Information over LPPa protocol.

The information about the DL CP length used in neighbour cells is not signalled to the UE. The UE therefore blindly detects the CP length of a neighbour cell during cell identification.

CP Length in MBSFN Subframes

Extended CP is always used in MBSFN subframes containing MBMS data. However, normal CP may be used, e.g., in blank MBSFN subframes. Further, as indicated above, CP length of CRS may be different from that of the PRS in the same MBSFN subframe.

MBSFN subframes with extended CP may be configured for various purposes. Further, except for MBMS data transmissions, they may be used for one or more purposes at the same time, e.g., as low-interference positioning subframes, low-interference subframes for backhaul signaling, and/or as ABS subframes with enhanced Inter-Cell Interference Coordination (eICIC). Further, there is no restriction to configure as low-interference subframes only blank MBSFN subframes or only normal subframes, e.g., low-interference subframes may be a mix of MBSFN and non-MBSFN subframes. In fact, it may be not even always possible to configure MBSFN subframes since they can only be configured in pre-defined MBSFN-configurable subframes.

CP Length in Positioning Subframes

Positioning subframes may be configured in subframes that use different CP length. Further, positioning signals need to be detected at multiple locations and the coverage of positioning signals does not need to be one-to-one mapped to cells for data transmissions, e.g., virtual cells may be created for positioning.

In addition to the explicit signalling of PRS CP length over LPPa and the CP length information over LPP, there exist also pre-defined rules related to the PRS CP length for OTDOA positioning:

PRS can only be transmitted in resource blocks in DL subframes configured for PRS transmission. If both normal and MBSFN subframes are configured as positioning subframes within a cell, the OFDM symbols in a MBSFN subframe configured for PRS transmission shall use the same CP as used for subframe #0. If only MBSFN subframes are configured as positioning subframes within a cell, the OFDM symbols configured for PRS in the MBSFN region of these subframes shall use extended CP length.

In a subframe configured for PRS transmission, the starting positions of the OFDM symbols configured for PRS transmission shall be identical to those in a subframe in which all OFDM symbols have the same CP length as the OFDM symbols configured for PRS transmission.

Multi-Carrier or Carrier Aggregation Concept

To enhance peak-rates within a technology, multi-carrier or carrier aggregation solutions are known. For example, it is possible to use multiple 5 MegaHertz (MHz) carriers in High-Speed Packet Access (HSPA) to enhance the peak-rate within the HSPA network. Similarly in LTE for example multiple 20 MHz carriers or even smaller carriers (e.g. 5 MHz) can be aggregated in the UL and/or on DL. Each carrier in multi-carrier or carrier aggregation system is generally termed as a Component Carrier (CC) or sometimes is also referred to a cell. In simple words the component carrier (CC) means an individual carrier in a multi-carrier system. The term Carrier Aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE specific signaling. The primary CC exists in both uplink and direction CA. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as Primary Cell (PCell) or Primary Serving Cell (PSC). Similarly the secondary serving cell is interchangeably called as Secondary Cell (SCell) or Secondary Serving Cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band (aka intra-band CA) or to different frequency band (inter-band CA) or any combination thereof (e.g. 2 CCs in band A and 1 CC in band B). The inter-band CA comprising of carriers distributed over two bands is also called as Dual-Band-Dual-carrier-High-Speed Downlink Packet Access (DB-DC-HSDPA) in HSPA or inter-band CA in LTE. Furthermore the CCs in intra-band CA may be adjacent or non-adjacent in frequency domain (aka intra-band non-adjacent CA). A hybrid CA comprising of intra-band adjacent, intra-band non-adjacent and inter-band is also possible. Using carrier aggregation between carriers of different technologies is also referred to as "multi-Radio Access Technology (RAT) carrier aggregation" or "multi-RAT-multi-carrier system" or simply "inter-RAT carrier aggregation". For example, the carriers from Wideband Code Division Multiple Access (WCDMA) and LTE may be aggregated. Another example is the aggregation of LTE and Code Division Multiple Access 2000 (CDMA2000) carriers. For the sake of clarity the carrier aggregation within the same technology as described can be regarded as 'intra-RAT' or simply 'single RAT' carrier aggregation.

The CCs or the serving cells in CA may or may not be co-located in the same site or base station or radio network node (e.g. relay, mobile relay etc). For instance the CCs may originate (i.e. transmitted/received) at different locations (e.g. from non-located BS or from BS and Remote Radio Head (RRH) or Remote Radio Unit (RRU)). The well-known examples of combined CA and multi-point communication are Distributed Antenna System (DAS), RRH, RRU, Coordinated Multi Point (CoMP), multi-point transmission/reception etc. The invention also applies to the multi-point carrier aggregation systems.

The multi-carrier operation may also be used in conjunction with multi-antenna transmission. For example signals on each CC may be transmitted by the eNB to the UE over two or more antennas.

SUMMARY

It is therefore an object of embodiments herein to provide a way of improving the handling of interference in a wireless communication system.

According to a first aspect of embodiments herein, the object is achieved by a method in a first radio node for adapting a receiver type in the first radio node. The first radio node comprises a first receiver type and a second receiver type. The two receiver types are different. The first radio node is comprised in a wireless communications network. The wireless communications network further comprises a second radio node and at least one third radio node. The method comprises determining a Cyclic Prefix, CP, length of at least one radio signal transmitted by the second radio node. The method also comprises determining a CP length of at least one radio signal transmitted by the at least one third radio node. The method further comprises adapting in the first radio node, the receiver type to be one of the first type and the radio type. The adapting is performed based on a relation between the CP length of the radio signal transmitted by the second radio node and the CP length of the radio signal transmitted by the third radio node.

According to a second aspect of embodiments herein, the object is achieved by a method in a network node for performing one or more network operational tasks. The network node is adapted to be comprised in a wireless communications network. The wireless communications network further comprises a first radio node, a second radio node and a third radio node. The network node is different from the first radio node. The method comprises receiving information from the first radio node. The information may be related to a capability of the first radio node for adapting the receiver type depending on a CP length of at least one radio signal transmitted by the second radio node and a CP length of at least one radio signal transmitted by the third radio node. The information may also be related the CP length of at least one radio signal transmitted by the third radio node, the CP length being determined by the first radio node. The method also comprises performing one or more network operational tasks based on the received information.

According to a third aspect of embodiments herein, the object is achieved by a method in a positioning node for using received information related to a CP length. The positioning node is adapted to be comprised in a wireless communications network. The method comprises obtaining CP length information from a first radio node of at least one radio signal transmitted by a third radio node. The first radio node and the third radio node are comprised in the wireless communications network. The first radio node is a wireless device. The method further comprises performing an action based on the obtained information. The action is at least one of: configuring positioning measurements in the first radio node or in another radio node, selecting positioning method, selecting at least one of different CP configurations and a corresponding signal type for configuring positioning measurements, and building up assistance data.

According to a fourth aspect of embodiments herein, the object is achieved by a first radio node for adapting a receiver type in the first radio node. The first radio node comprises a first receiver type and a second receiver type. The two receiver types are different. The first radio node is adapted to be comprised in a wireless communications network. The wireless communications network further comprises a second radio node and at least one third radio node. The first radio node comprises a determining circuit configured to determine a CP length of at least one radio signal to be transmitted by the second radio node. The determining circuit is also configured to determine a CP length of at least one radio signal to be transmitted by the at least one third radio node. The first radio node also comprises an adapting circuit configured to adapt in the first radio node, the receiver type to be one of the first type and the radio type. The adapting is performed based on a relation between the CP length of the radio signal to be transmitted by the second radio node and the CP length of the radio signal to be transmitted by the third radio node.

According to a fifth aspect of embodiments herein, the object is achieved by a network node for performing one or more network operational tasks. The network node is comprised in a wireless communications network, which wireless communications network further comprises a first radio node, a second radio node and a third radio node. The network node is different from the first radio node. The network node comprises a receiving circuit configured to receive information from the first radio node. The information may be related to a capability of the first radio node for adapting the receiver type depending on a CP length of at least one radio signal transmitted by the second radio node and a CP length of at least one radio signal transmitted by the third radio node. The information may be related to the CP length of at least one radio signal transmitted by the third radio node. The CP length is determined by the first radio node. The network node also comprises a performing circuit configured to perform one or more network operational tasks based on the received information.

According to a sixth aspect of embodiments herein, the object is achieved by a positioning node for using received information related to a CP length. The positioning node is comprised in a wireless communications network. The first radio node is a wireless device. The positioning node comprises a receiving circuit configured to obtain CP length information from a first radio node of at least one radio signal to be transmitted by a third radio node. The first radio node and the third radio node are comprised in the wireless communications network. The positioning node also comprises a performing circuit configured to perform an action based on the obtained information. The action is at least one of: configuring positioning measurements in the first radio node or in another radio node, selecting positioning method, selecting at least one of different CP configurations and a corresponding signal type for configuring positioning measurements, and building up assistance data.

By determining the CP length of at least one radio signal transmitted by the second radio node, and a CP length of at least one radio signal transmitted by the at least one third radio node, the first radio node may then be able to select the most appropriate receiver type when receiving signals from the second radio node when the received signal is interfered by the at least one third radio node. Thus, receiver performance is increased, while power consumption is not unnecessarily increased, and processing is decreased in relation to the received data rate.

Various embodiments disclosed herein may provide one or more of the potential advantages listed below, among others:

Signalling circuitry or means may increase the first radio node's and other network nodes' awareness about the CP configuration in other radio nodes, such as the second radio node and the third radio node, as well as collecting statistics to facilitate optimizing CP configuration in radio network nodes, such as the first radio node, the second radio node and the third radio node.

The first radio node may be able to select the most appropriate receiver type when receiving signals from the second radio node when the received signal is interfered by the at least one third radio node. This may lead to the following benefits:

The first radio node's receiver performance is enhanced under dominant interference from the at least third radio node.

On the average, the first radio node's power consumption is reduced.

On the average, the first radio node's processing is decreased in relation to the received data rate.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
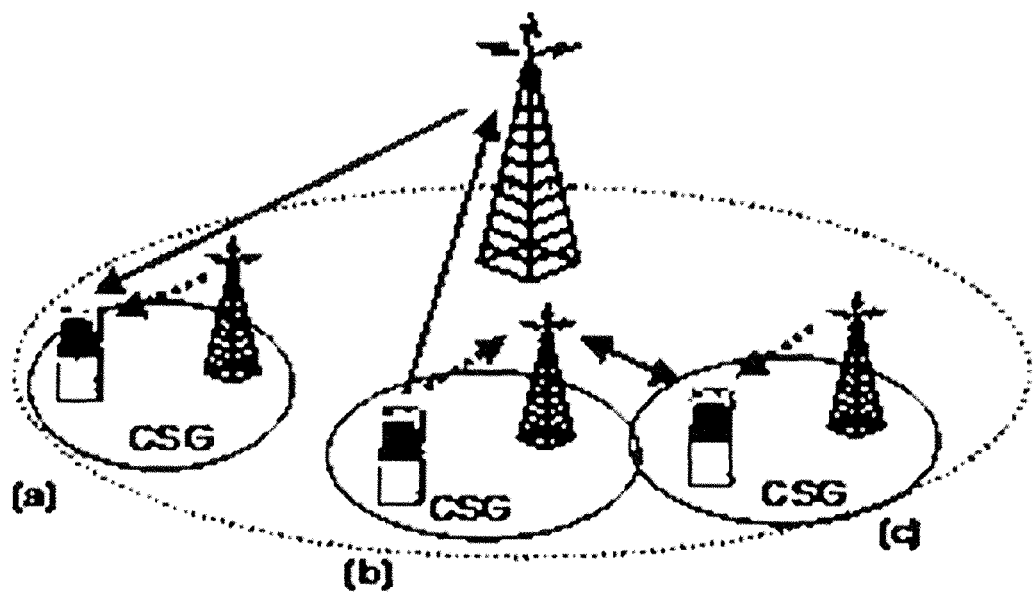
FIG. 1 illustrates various interference scenarios in heterogeneous deployments.
Figure 2:
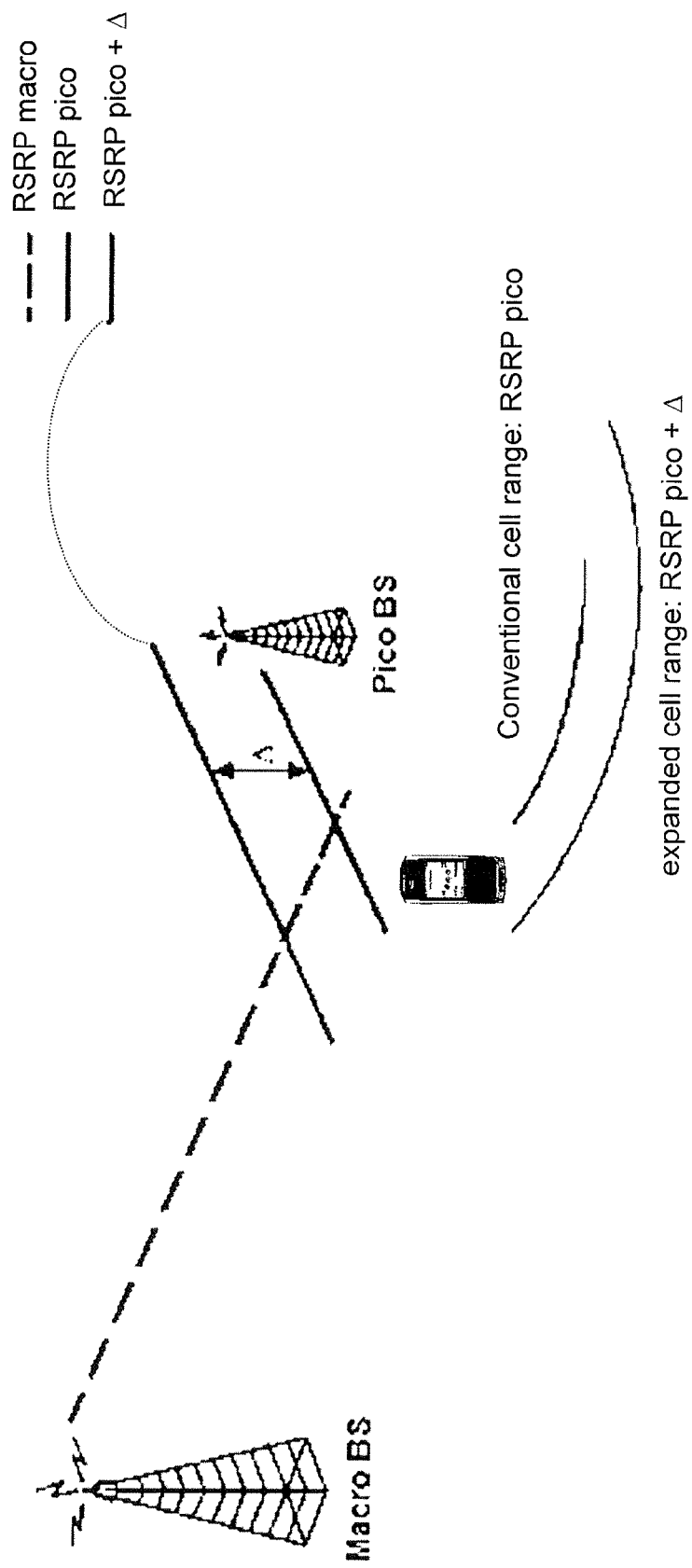
FIG. 2 illustrates cell range expansion in heterogeneous networks.

As part of the solution according to embodiments herein, one or more problems that may be associated with use of at least some of the prior art solutions will first be identified and discussed.

Cells with different CP length may be configured in a practical network. UE with enhanced receivers may benefit from knowing the CP length of the measured cells and the interfering cells. This information, however, is currently not available to the UE.

The prior art algorithms for enhanced receivers does not teach how to adapt their operation when cells with different CP length are configured in the network, particularly when the enhanced receiver is operating in high interference conditions.

There are also no requirements for enhanced receivers accounting for the CP length in the current 3GPP standard.

It has been recently proposed for enhanced receivers in heterogeneous deployments that the UE shall assume the same CP length for the aggressor (interfering) cell and victim (measured) cell. Such an implementation assumption, however, is a significant restriction for practical network deployments.

The current CP configuration information is not sufficient for DL positioning based on signals other than PRS. Detecting this information may be challenging for the UE since the signal may be too weak. According to the current requirements, the UE should be able to perform positioning measurements on signals whose level is weaker than the detection signal level supported by the UE.

The approaches described above could be pursued, but are not necessarily approaches that have been previously conceived or pursued. Therefore, unless otherwise indicated herein, the approaches described above are not prior art to claims filed in any application that claims priority from this application and are not admitted to be prior art by their disclosure above.

Embodiments will now be described more fully hereinafter with reference to the accompanying drawings, in which examples of the claimed embodiments are shown. This claimed embodiments may, however, be embodied in many different forms and should not be construed as limited to the embodiments set forth herein. Rather, these embodiments are provided so that this disclosure will be thorough and complete, and will fully convey the scope of the claimed embodiments to those skilled in the art. It should also be noted that these embodiments are not mutually exclusive. Components from one embodiment may be tacitly assumed to be present/used in another embodiment.

FIGS. 5a-d depict a wireless communications network 500 in which embodiments herein may be implemented. The wireless communications network 500 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Worldwide Interoperability for Microwave Access (WMax), or any cellular network or system.

Figure 5A:
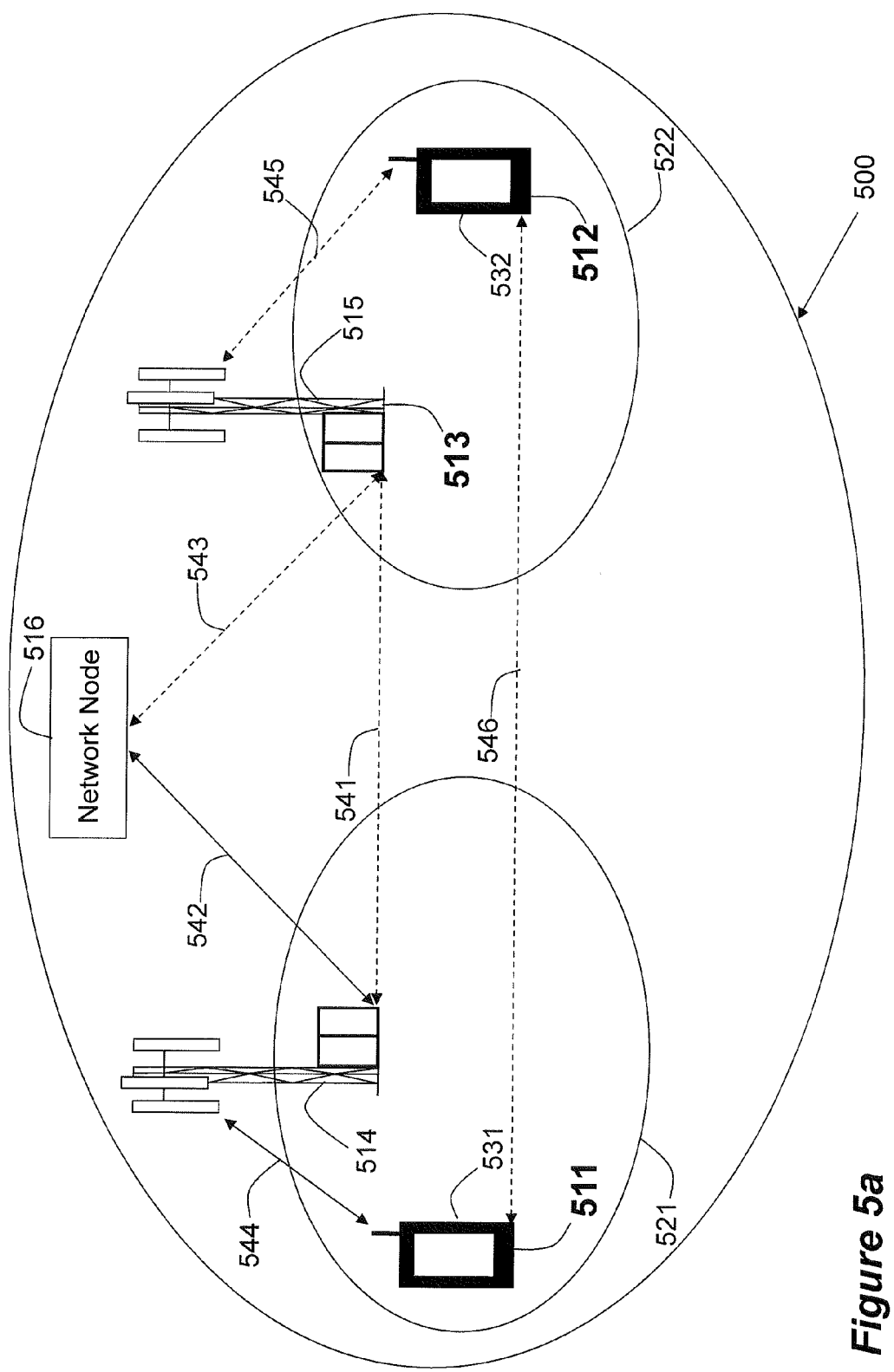
FIGS. 5a, 5b, 5c and 5d illustrate a schematic block diagram of a wireless communications network, according to some embodiments.
Figure 5B:
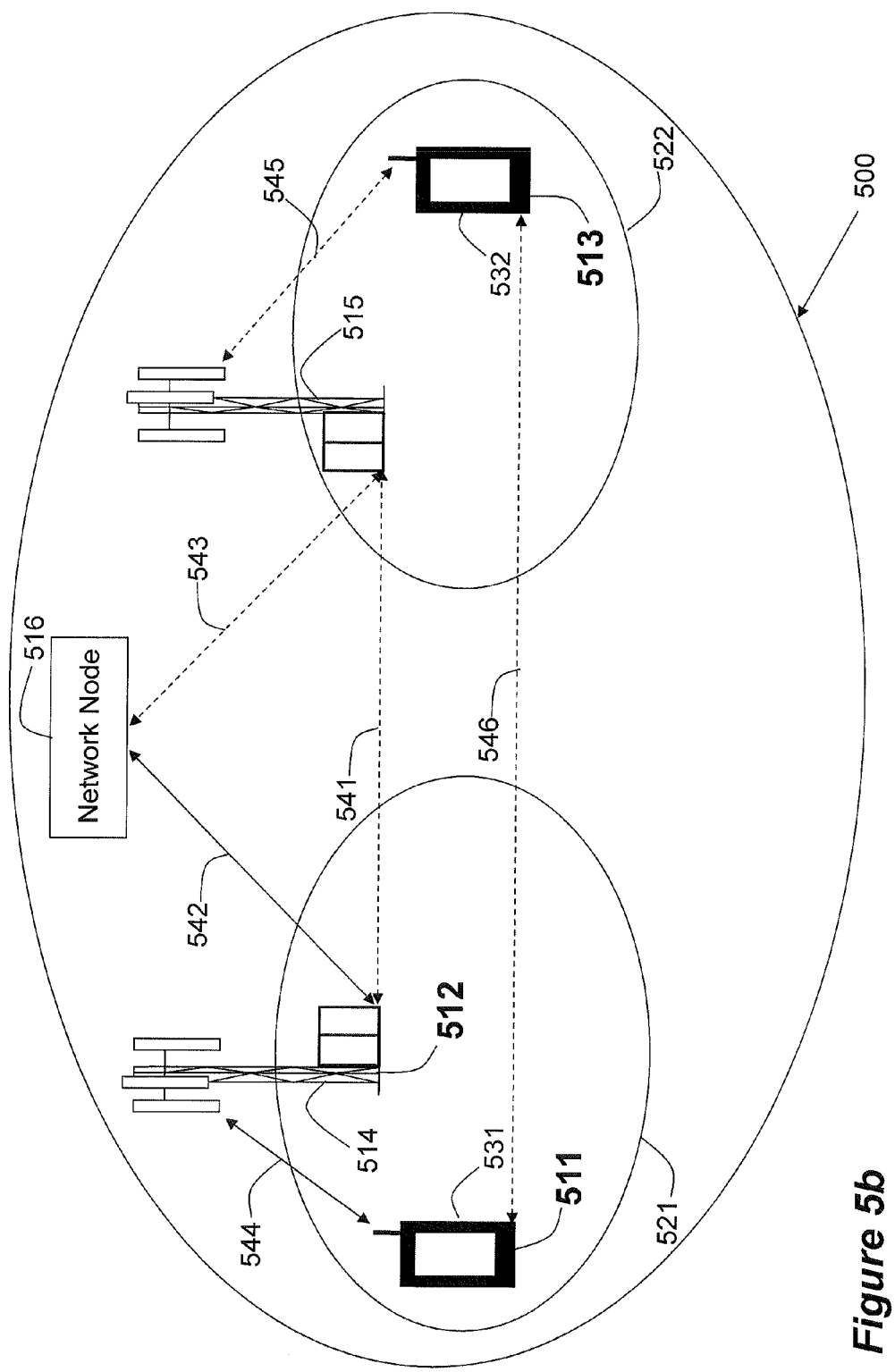
Figure 5C:
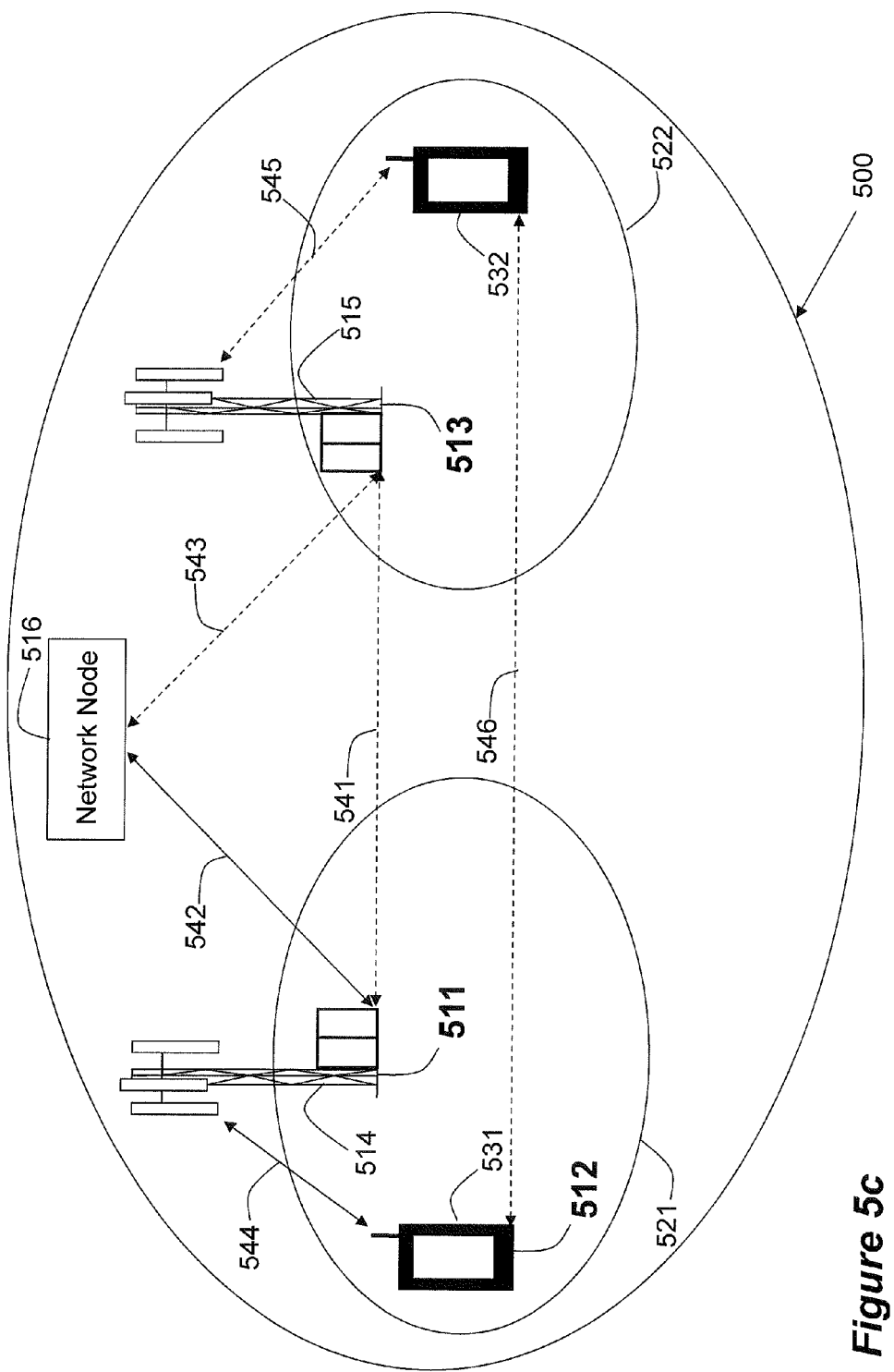
Figure 5D:
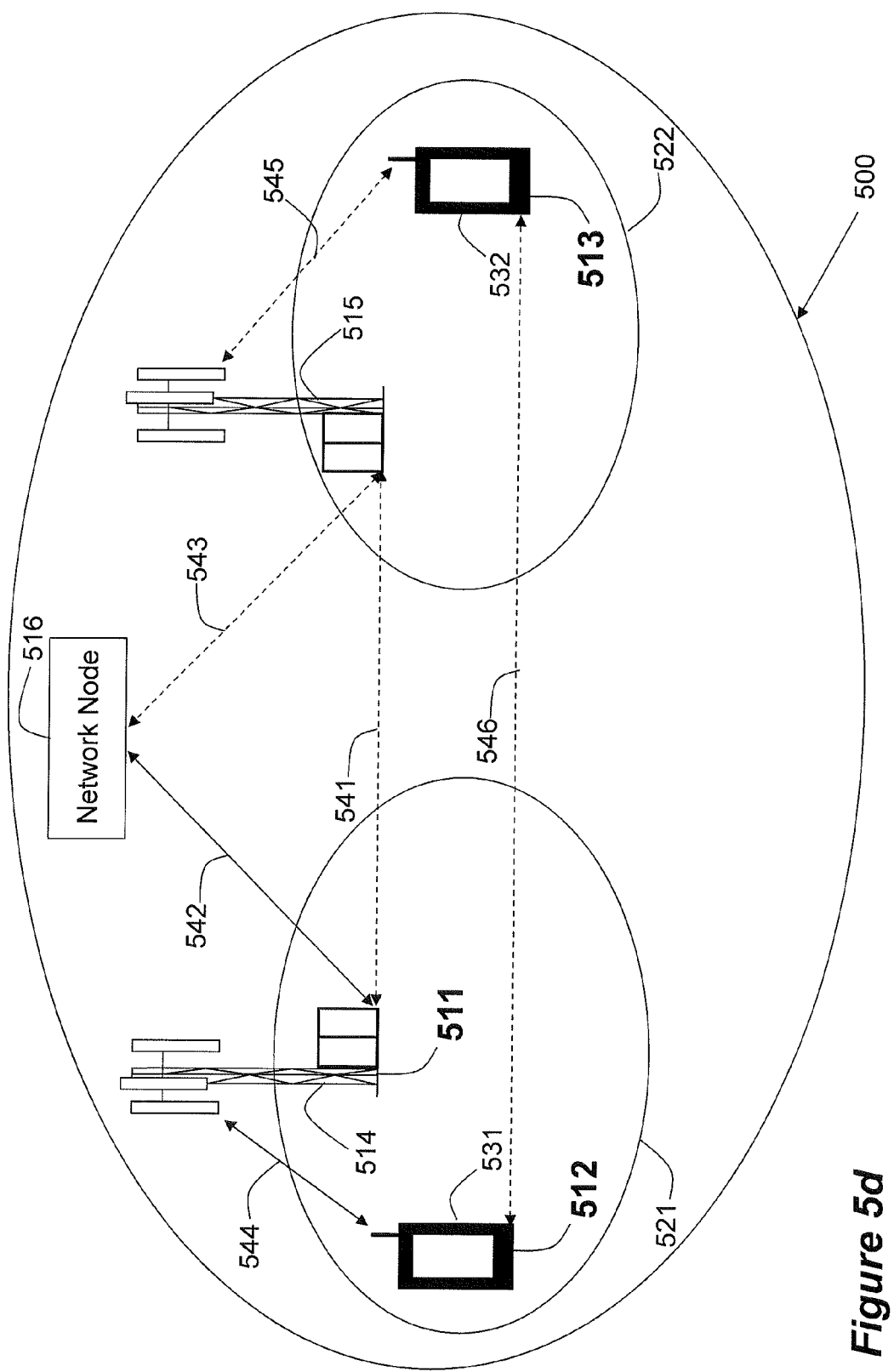

The wireless communications network 500 comprises a first radio node 511, a second radio node 512, and a third radio node 513. In the embodiment of FIG. 5a, and for illustrative purposes only, the first radio node 511 and the second radio node 512 may be wireless devices. However, in other embodiments, such as those depicted in FIGS. 5b-d, any of the first radio node 511, the second radio node 512 and the third radio node 513 may also be any of a wireless device, a radio network node, or a radio node in general, as defined below. The wireless communications network 500 comprises a first radio network node 514 and a second radio network node 515. Each of the first radio network node 514 and the second radio network node 515 may be, for example, base stations such as e.g. an eNB, eNodeB, or a Home Node B, a Home eNode B, femto Base Station, BS, pico BS or any other network unit capable to serve a device or a machine type communication device in a wireless communications network 500. In some particular embodiments, the first radio network node 514 or the second radio network node 515 may be a stationary relay node or a mobile relay node. The mixed wireless network 500 covers a geographical area which is divided into cell areas, wherein each cell area is served by a network node, although, one network node may serve one or several cells. In the examples depicted in FIG. 5a-d, the first radio network node 514 serves a first cell 521, and the second radio network node 515 serves a second cell 522. Each of the first radio network node 514 and the second radio network node 515 may be of different classes, such as e.g. macro eNodeB, home eNodeB or pico base station, based on transmission power and thereby also cell size. Typically, wireless communications network 500 may comprise more cells similar to 521 and 522, served by their respective network nodes. This is not depicted in FIGS. 5a-d for the sake of simplicity. Each of the first radio network node 514 and the second radio network node 515 may support one or several communication technologies, and its name may depend on the technology and terminology used. In 3GPP LTE network nodes, which may be referred to as eNodeBs or even eNBs, may be directly connected to one or more core networks.

In some embodiments, such as in that depicted in FIG. 5a, the third radio node 513 may be a network node 516. The network node 516 may be, for example, a "centralized network management node" or "coordinating node", which as used herein is a network node, which may also be a radio network node, which coordinates radio resources with one or more radio network nodes and/or UEs. Some examples of the coordinating node are network monitoring and configuration node, Operations Support System (OSS) node, Operations & Maintenance (O&M) node, Minimization of Drive Tests (MDT) node, Self-Organizing Network (SON) node, positioning node, a gateway node such as Packet Data Network Gateway (P-GW) or Serving Gateway (S-GW) network node or femto gateway node, a macro node coordinating smaller radio nodes associated with it, etc.

Further detailed information on network node and radio network node is provided below under the heading "Definitions and Generalizations".

The first radio network node 514 may e.g. communicate with the second radio network node 515 over a link 541 and communicate with the network node 516 over a link 542. The second radio network node 515 may communicate with the network node 516 over a link 543.

A number of wireless devices are located in the wireless communications network 500. In the example scenarios of FIGS. 5a-d, only two wireless devices are shown, first wireless device 531, and second wireless device 532. The first wireless device 531 may e.g. communicate with the first radio network node 514 over a radio link 544. The second wireless device 532 may communicate with the second radio network node 515 over a radio link 545. The first wireless device 531 may e.g. communicate with the second wireless device 532 over a radio link 546.

Each of the first wireless device 531 and second wireless device 532 is a wireless communication device such as a UE which is also known as e.g. mobile terminal, wireless terminal and/or mobile station. The device is wireless, i.e., it is enabled to communicate wirelessly in a wireless communication network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network.

Each of the first wireless device 531 and second wireless device 532 may further be referred to as a mobile telephone, cellular telephone, or laptop with wireless capability, just to mention some further examples. Each of the first wireless device 531 and second wireless device 532 in the present context may be, for example, portable, pocket-storable, handheld, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

Further detailed information of the first radio node 511, second radio node 512, third radio node 513 and the wireless communications network 500 is provided below under the heading "Definitions and Generalizations".

Figure 6:
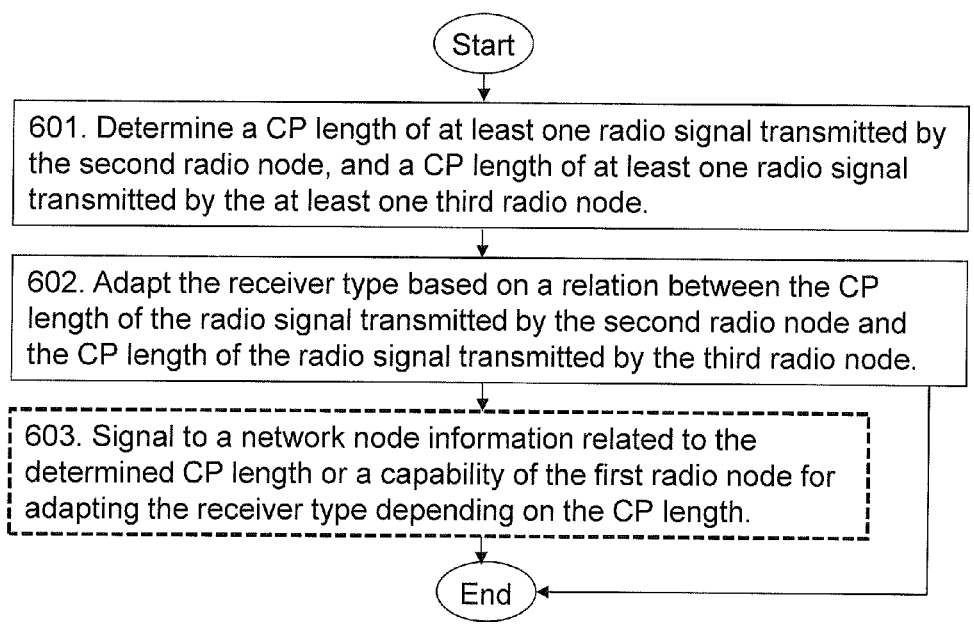
FIG. 6 is a flowchart depicting embodiments of a method in a first radio node, according to some embodiments.

Example of embodiments of a method in a first radio node 511 for adapting a receiver type in the first radio node 511, will now be described with reference to a flowchart depicted in FIG. 6. The first radio node 511 comprises a first receiver type and a second receiver type, the two receiver types being different. The first radio node 511 is comprised in a wireless communications network 500, which further comprises the second radio node 512 and the at least one third radio node 513.

In some embodiments, the first receiver type is not capable of mitigating interference caused by the at least one third radio node 513 or is capable of mitigating the interference, provided the interference from the at least one third radio node 513 is below a threshold, and the second receiver type is capable of mitigating interference caused by the at least one third radio node 513. Further detailed information on the first and second receiver types is provided below under the heading "Enhanced receiver configuration adaptive to the CP length".

As stated earlier, any of the first radio node 511, the second radio node 512 or the third radio node 513 may be one of: the first radio network node 514, the second radio network node 515, the first wireless device 531, or the second wireless device 532.

The method comprises the following actions, which actions may be taken in any suitable order. Dashed lines of some boxes in FIG. 6 indicate that the action is not mandatory.

Action 601

In this action, the first radio node 511 determines a Cyclic Prefix, CP, length of at least one radio signal transmitted by the second radio node 512, and a CP length of at least one radio signal transmitted by the at least one third radio node 513.

In some embodiments, the determining the CP length of the at least one radio signal transmitted by the at least one third radio node 513 is based on at least one of: received information on the CP length of the at least one radio signal transmitted by the at least one third radio node 513, radio characteristics of the at least one third radio node 513, and radio measurements.

This action is described below in further detail, for example, under the headings and subheadings "Embodiment 1: Enhanced receiver configuration adaptive to the CP length", "Embodiment 2: Methods of determining CP configuration of a cell", "Determining aggressor cell CP length based on explicit signaling", "Determining aggressor cell CP configuration based on collected statistics", and "Determining aggressor cell CP configuration based on implicit information and collected statistics".

Action 602

In this action, the first radio node 511 adapts in the first radio node 511, the receiver type to be one of the first type and the radio type, based on a relation between the CP length of the radio signal transmitted by the second radio node 512 and the CP length of the radio signal transmitted by the third radio node 513.

In some embodiments, the adapting is performed when the first radio node 511 receives signals from the second radio node 512, wherein the signals are interfered by the at least one third radio node 513. The second radio node 512 does not need to be associated with a serving cell to the first radio node 511.

In some embodiments, the first radio node 511 may adapt by selecting the second receiver type if the CP length of the at least one radio signal transmitted by the at least one third radio node 513 is smaller than the CP length of the at least one radio signal transmitted by the second radio node 512.

In some embodiments, the first radio node 511 may adapt by selecting the second receiver type if the CP length of the at least one radio signal transmitted by the at least one third radio node 513 and the CP length of the at least one radio signal transmitted by the second radio node 512 are the same.

In some embodiments wherein the signals from the second radio node 512 are interfered by the at least one third radio node 513, and wherein the adapting is further based on at least one of: type of the signals, whether the second radio node 512 and the at least one third radio node 513 are associated with serving cells of the first radio node 511, bandwidth of one of: the second radio node 512 and the third radio node 513, Multicast-Broadcast Single Frequency Network configuration of one of: the second radio node 512 and the at least one third radio node 513, measurement pattern for measurements in the second radio node 512, transmit pattern for one or more signals/channels transmitted in the at least one third radio node 513, pattern for short-range communication, low-activity state, level of synchronization between the second radio node 512 and the at least one third radio node 513, interference conditions, and one of: radio conditions and radio characteristics of the at least one third radio node 513.

This action is described below in further detail, for example, under the heading "Embodiment 1: Enhanced receiver configuration adaptive to the CP length".

Action 603

In this action, the first radio node 511 may signal to a node 514, 515, 516, 531, 532 in the wireless communications network 500, at least one of: a) information related to the determined CP length of the at least one radio signal transmitted by one of: the at least one third radio node 513 and the second radio node 512, and b) a capability of the first radio node 511 for adapting the receiver type depending on the CP length of the at least one radio signal transmitted by the second radio node 512 and the CP length of the at least one radio signal transmitted by the at least one third radio node 513. In these embodiments, the node 514, 515, 516, 531, 532 is different from the first radio node 511. This is an optional action.

In some embodiments, the node 514, 515, 516, 531, 532 may be a positioning node.

This action is described below in further detail under the headings and subheadings "Embodiment 3: Methods of signaling CP configuration information to other nodes for network operational tasks", "Signaling of the determined CP configuration or the information indicative of a preferred CP configuration to a network node", "Embodiment 4: Signaling of capability information associated with receiver type adaptability depending upon CP configuration", and "Additional information associated with UE capability", and "Radio node capability reporting mechanisms".

In some particular embodiments in any of the actions described above, transmissions by the second radio node 512 and transmissions by the at least one third radio node 513 may comprise a multi-leg transmission, wherein the multi-leg transmission comprises transmissions from multiple serving cells or radio links.

These embodiments are described below in further detail, for example, under the heading "Embodiment 5: Multi-leg transmissions and aggressor interference handling".

Figure 7:
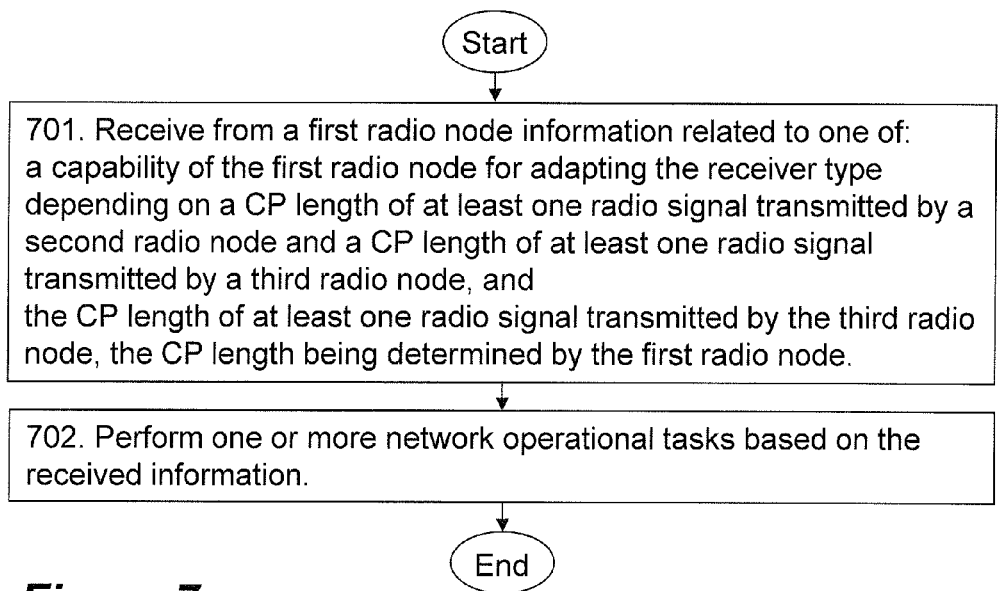
FIG. 7 is a flowchart depicting embodiments of a method in a network node, according to some embodiments.

Example of embodiments of a method in a network node 514, 515, 516 for performing one or more network operational tasks, will now be described with reference to a flowchart depicted in FIG. 7. The network node 514, 515, 516 is comprised in a wireless communications network 500, which further comprises the first radio node 511, the second radio node 512 and the third radio node 513. The network node (514, 515, 516) is different from the first radio node (511).

As stated earlier, any of the first radio node 511, the second radio node 512 or the third radio node 513 may be one of: the first radio network node 514, the second radio network node 515, the first wireless device 531, or the second wireless device 532.

The method comprises the following actions, which actions may be taken in any suitable order. Dashed lines of some boxes in FIG. 7 indicate that the action is not mandatory.

Action 701

In this action, the network node 514, 515, 516 receives information from the first radio node 511. The information is related to one of: a) a capability of the first radio node 511 for adapting the receiver type depending on a CP length of at least one radio signal transmitted by the second radio node 512 and a CP length of at least one radio signal transmitted by the third radio node 513, and b) the CP length of at least one radio signal transmitted by the third radio node 513, the CP length being determined by the first radio node 511.

In some embodiments, the received information may be related to the CP length of the at least one radio signal transmitted by of the third radio node 513, and wherein the one or more network operational tasks comprise at least one of: adaptation of CP configuration in one or more radio nodes 514, 515, 531, 532 in the wireless communications network 500, adjustment or tuning of radio network parameters, optimizing a CP length of at least one radio signal transmitted by the network node 514, 515, 516, configuration of the CP length of at least one radio signal transmitted by the network node 514, 515, 516 when the network node 514, 515, 516 is new, and positioning.

In some embodiments, the received information may be the capability of the first radio node 511 for adapting the receiver type, and wherein the one or more network operational tasks comprise at least one of: signalling the received information to another node 514, 515, 531, 532, deciding whether to send assistance information to the first radio node 511, deciding a type of assistance information to send to the first radio node 511, and updating a CP length used in different cells in the wireless communications network 500.

This action is described below in further detail under the headings and subheadings "Embodiment 3: Methods of signaling CP configuration information to other nodes for network operational tasks", "Signaling of the determined CP configuration or the information indicative of a preferred CP configuration to a network node", "Embodiment 4: Signaling of capability information associated with receiver type adaptability depending upon CP configuration", "Additional information associated with UE capability", and "Radio node capability reporting mechanisms", and "Use of received capability information for network operational tasks".

In some particular embodiments, the network node 514, 515, 516 may be a positioning node. In some of these embodiments, wherein the first radio node 511 is a wireless device, the network node 514, 515, 516 may obtain CP length information from the first radio node 511 of at least one radio signal transmitted by the third radio node 513, the first radio node 511 and the third radio node 513 being comprised in the wireless communications network 500.

This action is described below in further detail, for example, under the subheading "Obtaining CP configuration for positioning".

Action 702

In this action, the network node 514, 515, 516 performs one or more network operational tasks based on the received information.

This action is described below in further detail, for example, under the headings and subheadings "Adaptation of CP lengths in neighboring radio nodes", "Embodiment 3: Methods of signaling CP configuration information to other nodes for network operational tasks", and "Use of received capability information for network operational tasks".

In some of the particular embodiments wherein the network node 514, 515, 516 is a positioning node and wherein the first radio node 511 is a wireless device, the network node 516 may perform an action based on the obtained information, the action being at least one of: configuring positioning measurements in the first radio node 511 or in another radio node 512, 513, selecting positioning method, selecting at least one of different CP configurations and a corresponding signal type for configuring positioning measurements, and building up assistance data.

In some of these embodiments wherein the network node 514, 515, 516 is a positioning node and wherein the first radio node 511 is a wireless device 531, 532, the network node 516 may obtain different CP length information for different signals in a same cell 521, 522, the cell 521, 522, being comprised in the wireless communications network 500.

In some of these embodiments wherein the network node 514, 515, 516 is a positioning node and wherein the first radio node 511 is a wireless device, the network node 514, 515, 516 may obtaining further comprises obtaining an indication of a signal type CP length information is associated with.

This action is described below in further detail, for example, under the headings and subheadings "Embodiment 3: Methods of signaling CP configuration information to other nodes for network operational tasks", "Use of received capability information for network operational tasks".

Figure 8:
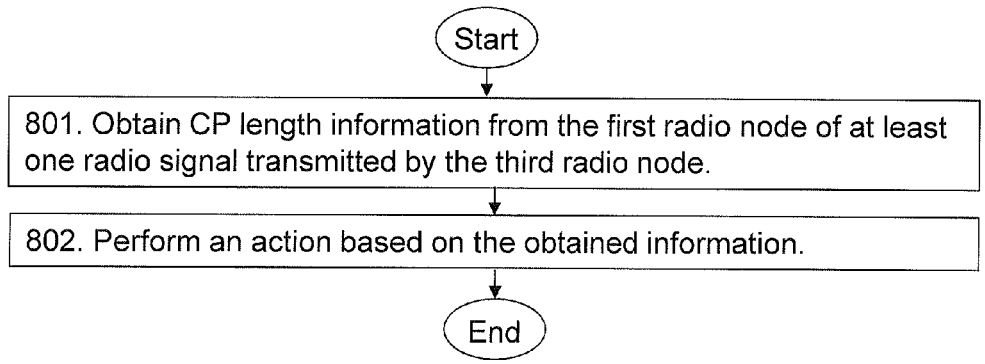
FIG. 8 is a flowchart depicting embodiments of a method in a positioning node, according to some embodiments.

Example of embodiments of a method in a positioning node 514, 515, 516, 531, 532 for using received information related to a cyclic prefix, CP, length, will now be described with reference to a flowchart depicted in FIG. 8. The positioning node 514, 515, 516, 531, 532 is adapted to be comprised in a wireless communications network 500.

As stated earlier, any of the first radio node 511, the second radio node 512 or the third radio node 513 may be one of: the first radio network node 514, the second radio network node 515, the first wireless device 531, or the second wireless device 532.

The method comprises the following actions, which actions may be taken in any suitable order. Dashed lines of some boxes in FIG. 8 indicate that the action is not mandatory.

Action 801

In this action, the positioning node 514, 515, 516, 531, 532 obtains CP length information from the first radio node 511 of at least one radio signal transmitted by the third radio node 513, the first radio node 511 and the third radio node 513 being comprised in the wireless communications network 500. In this action, the first radio node 511 is a wireless device 531, 532.

In some embodiments, the positioning node 514, 515, 516, 531, 532 may obtain different CP length information for different signals in a same cell 521, 522, the cell 521, 522 being comprised in the wireless communications network 500.

In some embodiments, the positioning node 514, 515, 516, 531, 532 may further obtain an indication of a signal type CP length information is associated with.

This action is described below in further detail, for example, under the heading "Obtaining CP configuration for positioning".

Action 802

In this action, the positioning node 514, 515, 516, 531, 532 performs an action based on the obtained information, the action being at least one of: configuring positioning measurements in the first radio node 511 or in another radio node 512, 513, selecting positioning method, selecting at least one of different CP configurations and a corresponding signal type for configuring positioning measurements, and building up assistance data. In this action, the first radio node 511 is a wireless device 531, 532.

This action is described below in further detail, for example, under the heading "Methods of signaling CP configuration information to other nodes for network operational tasks", "Obtaining CP configuration for positioning" and "Use of received capability information for network operational tasks".

Figure 9:
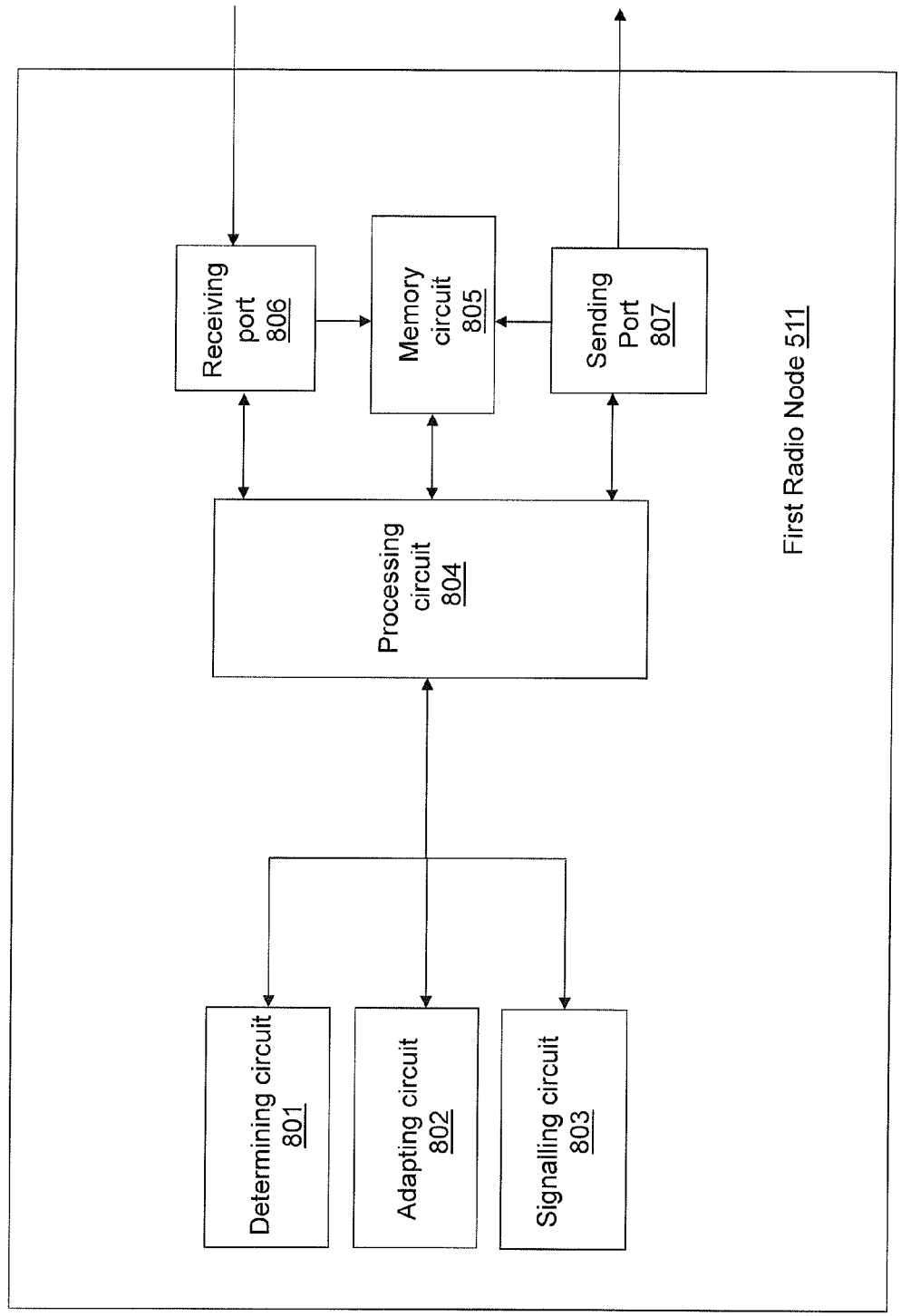
FIG. 9 is a block diagram of a first radio node that is configured according to some embodiments.

To perform the method actions in the first radio node 511 described above in relation to FIG. 6 for adapting a receiver type in the first radio node 511, the first radio node 511 comprises the following arrangement depicted in FIG. 9. The first radio node 511 comprises a first receiver type and a second receiver type, the two receiver types are different. The first radio node 511 is adapted to be comprised in the wireless communications network 500, which is further adapted to comprise the second radio node 512 and the at least one third radio node 513.

The detailed description of some of the following corresponds to the same references provided above, in relation to the actions described for the first node 511, and will thus not be repeated here. For example, further detailed information on the first and second receiver types is provided below under the heading "Enhanced receiver configuration adaptive to the CP length".

In some embodiments, the first receiver type is not capable of mitigating interference caused by the at least one third radio node 513 or is capable of mitigating the interference, provided the interference from the at least one third radio node 513 is below a threshold, and the second receiver type is capable of mitigating interference caused by the at least one third radio node 513.

As stated earlier, any of the first radio node 511, the second radio node 512 or the third radio node 513 may be one of: the first radio network node 514, the second radio network node 515, the first wireless device 531, or the second wireless device 532.

The first radio node 511 comprises a determining circuit 801 configured to determine a Cyclic Prefix, CP, length of at least one radio signal to be transmitted by the second radio node 512, and a CP length of at least one radio signal to be transmitted by the at least one third radio node 513.

In some embodiments, the determining circuit 801 is configured to determine based on at least one of: received information on the CP length of the at least one radio signal to be transmitted by the at least one third radio node 513, radio characteristics of the at least one third radio node 513, and radio measurements.

The first radio node 511 also comprises an adapting circuit 802 configured to adapt in the first radio node 511, the receiver type to be one of the first type and the radio type, based on a relation between the CP length of the radio signal to be transmitted by the second radio node 512 and the CP length of the radio signal to be transmitted by the third radio node 513.

In some embodiments, the adapting circuit 802 may be configured to adapt when the first radio node 511 receives signals from the second radio node 512, wherein the signals are interfered by the at least one third radio node 513. As stated earlier, the second radio node 512 does not need to be associated with a serving cell to the first radio node 511.

In some embodiments, the adapting circuit 802 is further configured to: a) select the second receiver type if the CP length of the at least one radio signal to be transmitted by the at least one third radio node 513 is smaller than the CP length of the at least one radio signal to be transmitted by the second radio node 512; and b) select the second receiver type if the CP length of the at least one radio signal to be transmitted by the at least one third radio node 513 and the CP length of the at least one radio signal to be transmitted by the second radio node 512 are the same.

In some embodiments, the adapting circuit 802 is further configured to adapt, when the signals to be transmitted from the second radio node 512 are interfered by the at least one third radio node 513, based on at least one of: type of the signals, whether the second radio node 512 and the at least one third radio node 513 are associated with serving cells of the first radio node 511, bandwidth of one of: the second radio node 512 and the third radio node 513, Multicast-Broadcast Single Frequency Network configuration of one of: the second radio node 512 and the at least one third radio node 513, measurement pattern for measurements in the second radio node 512, transmit pattern for one or more signals/channels to be transmitted in the at least one third radio node 513, pattern for short-range communication, low-activity state, level of synchronization between the second radio node 512 and the at least one third radio node 513, interference conditions, and one of: radio conditions and radio characteristics of the at least one third radio node 513.

In some embodiments, transmissions to be transmitted by the second radio node 512 and transmissions to be transmitted by the at least one third radio node 513 comprise a multi-leg transmission, wherein the multi-leg transmission comprises transmissions from multiple serving cells or radio links.

In some embodiments, the first radio node 511 may also comprise a signalling circuit 803 configured to signal to a node 514, 515, 516, 531, 532 configured to be comprised in the wireless communications network 500, at least one of: a) information related to the determined CP length of the at least one radio signal to be transmitted by one of: the at least one third radio node 513 and the second radio node 512, and b) a capability of the first radio node 511 for adapting the receiver type depending on the CP length of the at least one radio signal to be transmitted by the second radio node 512 and the CP length of the at least one radio signal to be transmitted by the at least one third radio node 513. In these embodiments, the node 514, 515, 516, 531, 532 is different from the first radio node 511.

In some of these embodiments, the node 514, 515, 516 may be a positioning node.

The embodiments herein adapting a receiver type in the first radio node 511 may be implemented through one or more processors, such as a processing circuit 804 in the first radio node 511 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first radio node 511. One such carrier may be in the form of a CD ROM disc. It may be however feasible with other data carriers such as a memory stick. The computer program code may furthermore be provided as pure program code on a server and downloaded to the first radio node 511.

The first radio node 511 may further comprise a memory circuit 805 comprising one or more memory units. The memory circuit 805 may be arranged to be used to store data such as, the information determined, adapted or signalled by the processing circuit 804 in relation to applications to perform the methods herein when being executed in the first radio node 511. Memory circuit 805 may be in communication with the processing circuit 804. Any of the other information processed by the processing circuit 804 may also be stored in the memory circuit 805.

In some embodiments, information such as information from the second or third radio nodes 512, 513, or from the network node 516 may be received through a receiving port 806. In some embodiments, the receiving port 806 may be, for example, connected to the one or more antennas in the first radio node 511. In other embodiments, the first radio node 511 may receive information from another structure in the wireless communications network 500 through the receiving port 806. Since the receiving port 806 may be in communication with the processing circuit 804, the receiving port 806 may then send the received information to the processing circuit 804. The receiving port 806 may also be configured to receive other information.

The information determined, adapted or signalled by the processing circuit 804 in relation to the method disclosed herein, may be stored in the memory circuit 805 which, as stated earlier, may be in communication with the processing circuit 804 and the receiving port 806.

The processing circuit 804 may be further configured to signal information, such as information related to the determined CP length or a capability of the first radio node for adapting the receiver type depending on the CP length, to the network node 516, through a sending port 807, which may be in communication with the processing circuit 804, and the memory circuit 805.

Those skilled in the art will also appreciate that the determining circuit 801, the adapting circuit 802 and the signalling circuit 803 described above may refer to a combination of analog and digital circuits, and/or one or more processors configured with software and/or firmware (e.g., stored in memory) that, when executed by the one or more processors such as the processing circuit 804, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
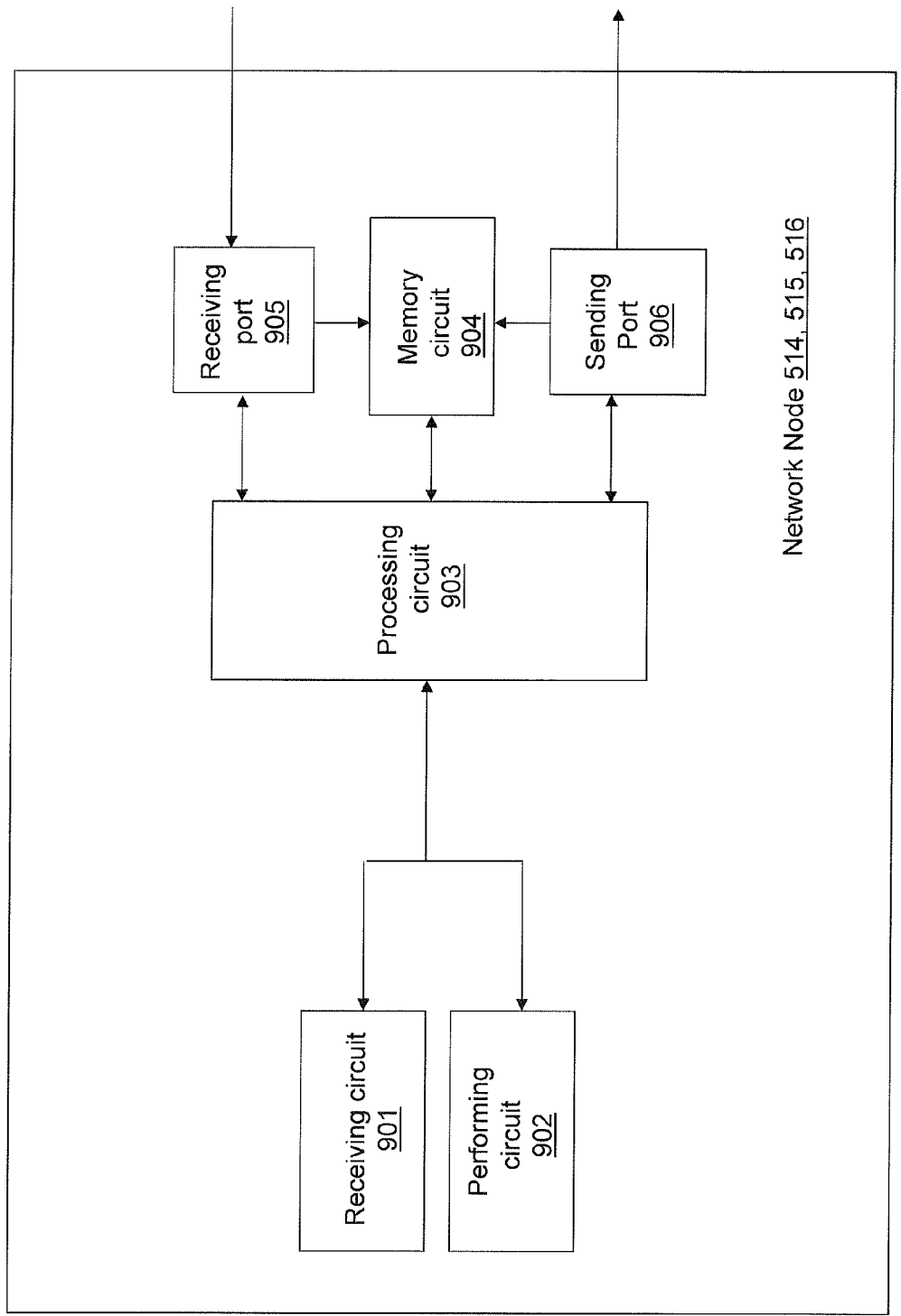
FIG. 10 is a block diagram of a network node that is configured according to some embodiments.

To perform the method actions in the network node 514, 515, 516 described above in relation to FIG. 7 for performing one or more network operational tasks, the network node 514, 515, 516 comprises the following arrangement depicted in FIG. 10. The network node 514, 515, 516 is adapted to be comprised in the wireless communications network 500. The wireless communications network 500 is further adapted to comprise a first radio node 511, a second radio node 512 and a third radio node 513. The network node 514, 515, 516 is different from the first radio node 511.

The detailed description of some of the following corresponds to the same references provided above, in relation to the actions described for the network node 514, 515, 516, and will thus not be repeated here. For example, further detailed information on the first and second receiver types is provided below under the heading "Enhanced receiver configuration adaptive to the CP length".

As stated earlier, any of the first radio node 511, the second radio node 512 or the third radio node 513 may be one of: the first radio network node 514, the second radio network node 515, the first wireless device 531, or the second wireless device 532.

The network node 514, 515, 516 comprises an receiving circuit 901 configured to receive information from the first radio node 511, the information being related to one of: a) a capability of the first radio node 511 for adapting the receiver type depending on a CP length of at least one radio signal transmitted by the second radio node 512 and a CP length of at least one radio signal transmitted by the third radio node 513, and b) the CP length of at least one radio signal transmitted by the third radio node 513, the CP length being determined by the first radio node 511.

In some embodiments, the received information is related to the CP length of the at least one radio signal to be transmitted by of the third radio node 513, and wherein the one or more network operational tasks comprise at least one of: adaptation of CP configuration in one or more radio nodes 514, 515, 531, 532 configured to be comprised in the wireless communications network 500, adjustment or tuning of radio network parameters, optimizing a CP length of at least one radio signal transmitted by the network node 514, 515, 516, configuration of the CP length of at least one radio signal transmitted by the network node 514, 515, 516 when the network node 514, 515, 516 is new, and positioning.

In some embodiments, the received information is the capability of the first radio node 511 for adapting the receiver type, and wherein the one or more network operational tasks comprise at least one of: signalling the received information to another node 514, 515, 531, 532, deciding whether to send assistance information to the first radio node 511, deciding a type of assistance information to send to the first radio node 511, and updating a CP length used in different cells in the wireless communications network 500.

In some particular embodiments, the network node 514, 515, 516 is a positioning node. In these embodiments wherein the first radio node 511 is a wireless device 531, 532, the receiving circuit 901 is configured to obtain CP length information from a first radio node 511 of at least one radio signal to be transmitted by a third radio node 513, the first radio node 511 and the third radio node 513 being adapted to be comprised in the wireless communications network 500.

The network node 514, 515, 516 also comprises a performing circuit 902 configured to perform one or more network operational tasks based on the received information.

In some particular embodiments, the network node 514, 515, 516 is a positioning node. In these embodiments wherein the first radio node 511 is a wireless device 531, 532, the performing circuit 902 is configured to perform an action based on the obtained information, the action being at least one of: configuring positioning measurements in the first radio node 511 or in another radio node 512, 513, selecting positioning method, selecting at least one of different CP configurations and a corresponding signal type for configuring positioning measurements, and building up assistance data.

In some of these embodiments wherein the network node 514, 515, 516 is a positioning node and wherein the first radio node 511 is a wireless device, the receiving circuit 901 may be further configured to obtain different CP length information for different signals in a same cell, the cell being adapted to be comprised in the wireless communications network 500.

In some of these embodiments wherein the network node 514, 515, 516 is a positioning node and wherein the first radio node 511 is a wireless device, the receiving circuit 901 may be further configured to obtain an indication of a signal type CP length information is associated with.

The embodiments herein for performing one or more network operational tasks may be implemented through one or more processors, such as a processing circuit 903 in the network node 514, 515, 516 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the network node 514, 515, 516. One such carrier may be in the form of a CD ROM disc. It may be however feasible with other data carriers such as a memory stick. The computer program code may furthermore be provided as pure program code on a server and downloaded to the network node 514, 515, 516.

The network node 514, 515, 516 may further comprise a memory circuit 904 comprising one or more memory units. The memory circuit 904 may be arranged to be used to store data such as, the information received by the processing circuit 903 in relation to applications to perform the methods herein when being executed in the network node 514, 515, 516. Memory circuit 904 may be in communication with the processing circuit 903. Any of the other information processed by the processing circuit 903 may also be stored in the memory circuit 904.

In some embodiments, information from the first, second or third radio nodes 511, 512, 513, respectively, may be received through a receiving port 905. In some embodiments, the receiving port 905 may be, for example, connected to the one or more antennas in the network node 514, 515, 516. In other embodiments, the network node 514, 515, 516 may receive information from another structure in the wireless communications network 500 through the receiving port 905. Since the receiving port 905 may be in communication with the processing circuit 903, the receiving port 905 may then send the received information to the processing circuit 903. The receiving port 905 may also be configured to receive other information.

The information received by the processing circuit 903 in relation to methods herein, may be stored in the memory circuit 904 which, as stated earlier, may be in communication with the processing circuit 903 and the receiving port 905.

The processing circuit 903 may be further configured to send or signal information to, for example, the first radio node 511, the second radio node 512 or to the third node 513, through a sending port 906, which may be in communication with the processing circuit 903, and the memory circuit 904.

Those skilled in the art will also appreciate that the receiving circuit 901 and the performing circuit 902 described above may refer to a combination of analog and digital circuits, and/or one or more processors configured with software and/or firmware (e.g., stored in memory) that, when executed by the one or more processors such as the processing circuit 903, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 11:
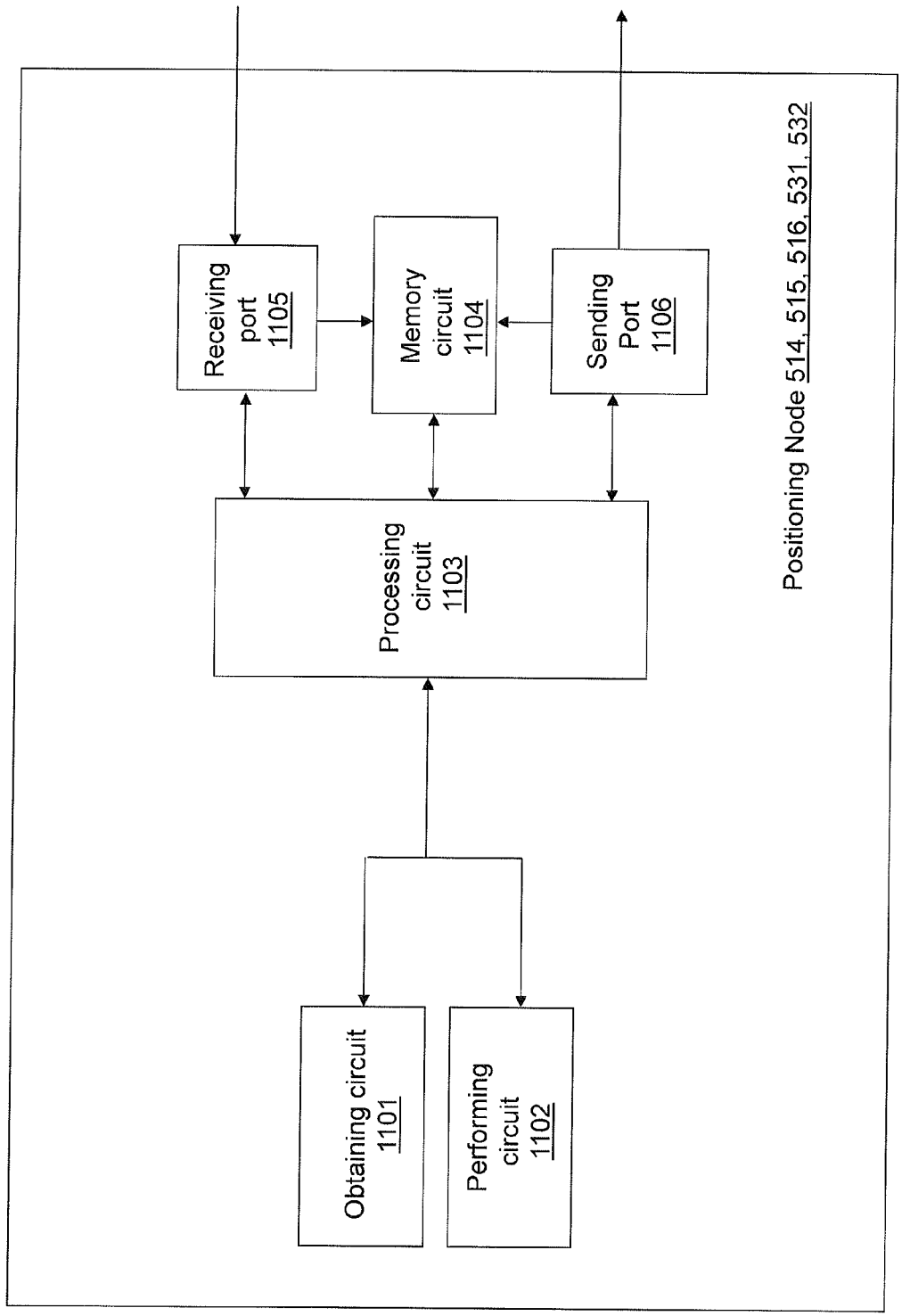
FIG. 11 is a block diagram of a network node that is configured according to some embodiments.

To perform the method actions in the positioning node 514, 515, 516, 531, 532 described above in relation to FIG. 8 for using received information related to a cyclic prefix, CP, length, the positioning node 514, 515, 516, 531, 532 comprises the following arrangement depicted in FIG. 11. The positioning node 514, 515, 516, 531, 532 is adapted to be comprised in the wireless communications network 500.

The detailed description of some of the following corresponds to the same references provided above, in relation to the actions described for the positioning node 514, 515, 516, 531, 532, and will thus not be repeated here. For example, further detailed information on the actions configured to be performed by the obtaining circuit is provided below under the heading "Obtaining CP configuration for positioning".

As stated earlier, any of the first radio node 511, the second radio node 512 or the third radio node 513 may be one of: the first radio network node 514, the second radio network node 515, the first wireless device 531, or the second wireless device 532.

The positioning node 514, 515, 516, 531, 532 comprises an obtaining circuit 1101 configured to obtain CP length information from a first radio node 511 of at least one radio signal to be transmitted by a third radio node 513, the first radio node 511 and the third radio node 513 being adapted to be comprised in the wireless communications network 500. In these embodiments, the first radio node 511 is a wireless device 531, 532.

In some embodiments, the obtaining circuit 1101 is further configured to obtain different CP length information for different signals in a same cell, the cell being adapted to be comprised in the wireless communications network 500.

In some embodiments, the obtaining circuit 1101 is further configured to obtain an indication of a signal type CP length information is associated with.

The positioning node 514, 515, 516, 531, 532 also comprises a performing circuit 1102 configured to perform an action based on the obtained information, the action being at least one of: configuring positioning measurements in the first radio node 511 or in another radio node 512, 513, selecting positioning method, selecting at least one of different CP configurations and a corresponding signal type for configuring positioning measurements, and building up assistance data. In these embodiments, the first radio node 511 is a wireless device 531, 532.

The embodiments herein for using received information related to a cyclic prefix, CP, length may be implemented through one or more processors, such as a processing circuit 1103 in the positioning node 514, 515, 516, 531, 532 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the positioning node 514, 515, 516, 531, 532. One such carrier may be in the form of a CD ROM disc. It may be however feasible with other data carriers such as a memory stick. The computer program code may furthermore be provided as pure program code on a server and downloaded to the positioning node 514, 515, 516, 531, 532.

The positioning node 514, 515, 516, 531, 532 may further comprise a memory circuit 1104 comprising one or more memory units. The memory circuit 1104 may be arranged to be used to store data such as, the information received by the processing circuit 1103 in relation to applications to perform the methods herein when being executed in the positioning node 514, 515, 516, 531, 532. Memory circuit 1104 may be in communication with the processing circuit 1103. Any of the other information processed by the processing circuit 1103 may also be stored in the memory circuit 1104.

In some embodiments, information from the first, second or third radio nodes 511, 512, 513, respectively, may be received through a receiving port 1105. In some embodiments, the receiving port 1105 may be, for example, connected to the one or more antennas in the positioning node 514, 515, 516, 531, 532. In other embodiments, the positioning node 514, 515, 516, 531, 532 may receive information from another structure in the wireless communications network 500 through the receiving port 1105. Since the receiving port 1105 may be in communication with the processing circuit 1103, the receiving port 1105 may then send the received information to the processing circuit 1103. The receiving port 1105 may also be configured to receive other information.

The information received by the processing circuit 1103 in relation to methods herein, may be stored in the memory circuit 1104 which, as stated earlier, may be in communication with the processing circuit 1103 and the receiving port 1105.

The processing circuit 1103 may be further configured to send or signal information to the first radio node 511, the second radio node 512 or to the third node 513, through a sending port 1106, which may be in communication with the processing circuit 1103, and the memory circuit 1104.

Those skilled in the art will also appreciate that the obtaining circuit 1101 and the performing circuit 1102 described above may refer to a combination of analog and digital circuits, and/or one or more processors configured with software and/or firmware (e.g., stored in memory) that, when executed by the one or more processors such as the processing circuit 1103, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Definitions and Generalizations

Definitions explained in sections below may apply to any embodiment described in the current specification, including the Detailed Description herein, as well as in the associated Claims, Figures and Summary sections.

A wireless device, such as the first wireless device 531 and the second wireless device 532, and UE are used interchangeably in the description. Any reference to a wireless device (or UE) herein, is to be understood to apply to any of the first wireless device 531 and the second wireless device 532. A UE may comprise any device equipped with a radio interface and capable of at least generating and transmitting a radio signal to a radio network node, such as the first radio network node 514, the second radio network node 515. Note that even some radio network nodes, such as the first radio network node 514, the second radio network node 515, e.g., femto BS (aka home BS), may also be equipped with a UE-like interface. Some example of "UE" that are to be understood in a general sense are Personal Digital Assistant (PDA), laptop, mobile, sensor, fixed relay, mobile relay, any radio network node equipped with a UE-like interface (e.g., small Radio Base Station (RBS), eNodeB, femto BS).

A radio node, such as the first radio node 511, the second radio node 512 and the third radio node 513, is characterized by its ability to transmit and/or receive radio signals and it comprises at least a transmitting or receiving antenna. A radio node may be a UE or a radio network node, such as the first radio network node 514, the second radio network node 515. Some examples of radio nodes are a radio base station (e.g., eNodeB in LTE or NodeB in Universal Terrestrial Radio Access Network (UTRAN)), a relay, a mobile relay, remote radio unit (RRU), remote radio head (RRH), a sensor, a beacon device, a measurement unit (e.g., Location Measurement Units (LMUs)), user terminal, PDA, mobile, iPhone, laptop, etc. Any reference to a radio node herein, is to be understood to apply to any of the first wireless device 531, the second wireless device 532, the first radio network node 514 and the second radio network node 515, unless otherwise noted.

A radio network node, such as the first radio network node 514, and the second radio network node 515, is a radio node comprised in a radio communications network, such as wireless communications network 500, and typically characterized by own or associated network address. For example, a mobile equipment, such as the first wireless device 531 and the second wireless device 532, in a cellular network, such as wireless communications network 500, may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g., an example dual-mode user equipment may operate with any one or combination of WiFi and LTE or HSPA and LTE/LTE-A). A radio network node, including eNodeB, RRH, RRU, or transmitting-only/receiving-only nodes, may or may not create own cell, such as the first cell 521 and the second cell 522. It may also share a cell with another radio node which creates own cell, or it may operate in a cell sector. More than one cell or cell sectors (commonly named in the described embodiments by a generalized term "cell" which may be understood as a cell or its logical or geographical part) may be associated with one radio node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell associated with a transmit node, and it may or may not share the same cell IDentifier (ID) with another transmit node. Any reference to a cell herein, is to be understood to apply to any of the first cell 521 and the second cell 522, unless otherwise noted. Also, any reference to a radio network node herein, is to be understood to apply to any of the first radio network node 514 and the second radio network node 515.

Receiving/measuring radio node, such as the first radio node 511, is a radio node receiving a radio signal and/or performing measurements on a radio signal. Any reference to a receiving or measuring radio node herein, or receiver node, receiver network node is to be understood to apply to the first radio node 511. Some examples: a wireless device receiving DL radio signals or eNodeB receiving radio signals in UL. The measurements and signal/channel receptions may also be performed at specific time occasions, which may also be indicated by a pattern, e.g., restricted measurement pattern indicating subframes for DL measurements for a UE in a heterogeneous deployment. A pattern describing measurement/receive occasions may or may not be provided to/obtained by the receiving/measuring node; the pattern may also be pre-defined by a rule (e.g., a standard).

A target/measured radio node, such as the second radio node 512, e.g., a wireless device or a radio network node, is a radio node whose transmissions are being received or measured by the receiving/measuring radio node. Any reference to a target or measured radio node, target node, target measured node, measured node, or victim node herein, is to be understood to apply to the second radio node 512. The transmissions of the aggressor, such as the third radio node 513, may also be at specific time occasions or may be configured differently at different time occasions, e.g., following a transmit pattern. A pattern describing the measured signal transmissions may or may not be provided to/obtained by the receiving/measuring node; the pattern may also be pre-defined by a rule (e.g., a standard). Any reference to a measured cell, target measured cell herein, is to be understood to apply to the corresponding cell of the second radio node 512.

An aggressor radio node, such as the third radio node 513, e.g., another wireless device transmitting in UL or radio network node transmitting in DL, is a radio node transmitting signals interfering to the signals being received and/or measured by the receiving/measuring radio node. Any reference to an aggressor radio node, aggressor node, interfering node herein, is to be understood to apply to the third radio node 513. "Aggressor cell" (which may be DL or UL) is used in some embodiments to refer to transmissions of the aggressor radio node, e.g., a UE in a neighbor cell may be an aggressor to a receiving/measuring UE or an eNodeB may be an aggressor radio node to transmissions of the UE's serving radio node. Any reference to an aggressor cell, interfering cell herein, is to be understood to apply to the corresponding cell of the third radio node 513. The transmissions of the aggressor may also be at specific time occasions or may be configured differently at different time occasions, e.g., following a transmit pattern which may be configured in heterogeneous deployments in an aggressor cell. A pattern describing aggressor's transmit activity or inactivity may or may not be provided to/obtained by the receiving/measuring node; the pattern may also be pre-defined by a rule (e.g., a standard).

A network node may be any radio network node, such as the first radio network node 514, the second radio network node 515, or core network node, such as network node 516. Some non-limiting examples of a network node are an eNodeB, Radio Network Controller (RNC), positioning node, Mobility Management Entity (MME), Public Safety Answering Point (PSAP), Self-Optimized Network (SON) node, Minimization of Drive Tests (MDT) node, (typically but not necessarily) coordinating node, and Operation and Maintenance (O&M) node.

A network node or a UE are commonly referred to as a node.

Positioning node, such as the first radio network node 514, the second radio network node 515, the network node 516, the first wireless device 531, and the second wireless device 532 described in different embodiments is a node with positioning functionality. For example, for LTE it may be understood as a positioning platform in the user plane (e.g., Service Location Protocol (SLP) in LTE) or a positioning node in the control plane (e.g., E-SMLC in LTE). SLP may also consist of Secure user plane Location Centre (SLC) and Secure user plane Location Positioning Centre (SPC), where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node", such as the first radio network node 514, the second radio network node 515, or the network node 516, used herein is a network and/or node, which coordinates radio resources with one or more radio nodes. Some examples of the coordinating node are network monitoring and configuration node, Operations Support System (OSS) node, Operation and Maintenance (O&M), Minimization of Drive Tests (MDT) node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described in the invention is either via direct links or logical links (e.g. via higher layer protocols and/or via one or more network and/or radio nodes). For example, signaling from a coordinating node may pass another network node, e.g., a radio network node.

The described embodiments are not limited to LTE, but may apply with any Radio Access Network (RAN), single- or multi-RAT. Some other RAT examples are LTE-Advanced, UMTS, HSPA, Global System for Mobile communications (GSM), cdma2000, WiMAX, and WiFi.

"Receiver type" is used interchangeably with "receiver technique".

The term "subframe" used in the embodiments described herein is an example resource in the time domain, and in general it may be any pre-defined time instance or time period.

The term "signal" used in the embodiments described herein may refer to physical signals (e.g., reference signals, cell-specific reference signals, user-specific reference signals, positioning reference signals, MBSFN reference signals, or synchronization signals), broadcast channels (e.g., Physical Broadcast CHannel), or physical control or data channels (e.g., Physical Downlink Control CHannel, Physical Control Format Indicator CHannel, Physical Hybrid Automatic Repeat reQuest Indicator CHannel, or Physical Downlink Shared CHannel (PDSCH)).

The term "CP length" used in the embodiments herein referrers to the CP length of the received transmission (e.g., a cell DL transmission), but may also be understood as CP configuration in general which may comprise CP length, bandwidth with which the CP length is associated, signal type with which the CP configuration is associated to, time- and/or frequency-resources with which the CP configuration is associated to, transmission direction associated with CP configuration (DL/UL/both), cell or transmit node with which the CP configuration is associated to. The CP configuration may also refer to any received transmissions in general which may be transmitted by another wireless device (e.g., in device-to-device or machine-to-machine communication). Hence the term "aggressor cell transmission" (and its CP information) is an example of an aggressor transmission used in the embodiments; another example of an aggressor transmission could be a transmission by another wireless device (and corresponding CP information). Similarly, the term "target/victim cell measurement/reception" (and its CP information) is an example of a target received signal used in the described embodiments; another example could be a target signal received from another wireless device (and corresponding CP information).

The CP configuration herein may comprise UL CP or DL CP configuration or both. DL and UL CP configuration does not need to be the same. The CP configuration in a cell may also apply for all transmissions in the cell (or its part) or for specific signals/channels.

The embodiments described herein may be independent embodiments or any embodiment may be combined in any combination with at least one other embodiment (or applied together) fully or in part. Although many embodiments in the next sections are described for a UE as an example of the receiving/measuring radio node, the described embodiments may also be applied to a radio node in general (e.g., any wireless device or radio network node).

Embodiment 1

Enhanced Receiver Configuration Adaptive to the CP Length

Embodiments described in this section may be combined, at least in part, with embodiments described below.

The basic idea of this embodiment is that the radio node (e.g., a UE, which is used in the following description as an illustrative non-limiting example of a radio node) adapts its receiver type for receiving signals from the target measured cell depending upon the CP configurations (DL, UL, or both) used in the aggressor radio node or the relationship of the CP configuration of the measured node (or aka target node or even target measured node or even victim node) and the aggressor node (aka interfering node).

The aggressor cell may be any cell different from the measured cell; typically an aggressor cell is a relatively strongly interfering cell. There may be more than one aggressor cells. Some examples of the aggressor cells are a serving cell when the measured cell is a neighbor cell; a macro cell when the measured cell is a pico cell; a CSG cell for a non-CSG UE; any cell whose interference is at least as high as the measured cell's received signal; any cell whose received signal is within a threshold from the received signal strength of the measured cell. The measured cell may be a serving cell or a neighboring cell or any type of serving cell which may belong to multicarrier operation, CoMP, RRH etc. For example, in multicarrier or CoMP operation there is one primary serving cell (PCell) and at least one secondary serving cell (SCell). The UE may apply the method of adapting its receiver on any one or more serving cells. Furthermore, the adaptation may be applied independently on each serving cell or jointly on group of serving cells, on the same or different carrier frequencies. Each serving cell typically has a different aggressor cell, especially in case of carrier aggregation or CoMP with each link on different carriers. Therefore based on receiver adaptation, it is possible that the UE uses different receiver types on different serving cells, especially if the conditions (e.g. radio conditions, CP length etc) are different on different aggressor cells. In case of single carrier CoMP or RRH scenario the CoMP cluster (comprising of multiple legs or links), all links may have the same or common aggressor cell(s). In this case the UE may use the same or even different receiver types based on adaptation.

The CP length as described above may be determined by the radio node based, e.g., on any one or any combination of;
  explicit indication received from a network node (e.g., in the form of the CP length information and/or a pattern of time and/or frequency resources with the corresponding CP length which may be pre-defined or also comprised in the indication), e.g., via RRC or X2,
  implicit or derived information,
  information stored in the radio node's memory (e.g., after handover, cell change, cell identification procedure or cell measurements), and
  radio characteristics of the cells.

The mechanism of receiver adaptation is elaborated with an example considering three receiver types: receiver type A, such as, for example, the first receiver type in some embodiments, receiver type B and receiver type C, any of which receiver type B and receiver type C may be such as, for example, the second receiver type in some embodiments. In some embodiments, receiver type B may be the first receiver type, and receiver type C may be the second receiver type.

The receiver type A is considered to be a baseline or default receiver which is not capable of mitigating interference experienced from aggressor cell(s) or it can only mitigate the interference only if it is below a certain threshold level. On the other hand receiver types B and C are capable of mitigating the interference received from aggressor cell(s). The receiver type B is considered to be less sensitive to the CP length of CPs used in target and aggressor cells whereas receiver type C is considered to be more sensitive to the CP length of the CPs used in target and aggressor cells. On the other hand receiver type C may be more effective than receiver type C in mitigating the inter-cell interference in ideal conditions. In terms of processing the receiver type A may require least processing and receiver type C may be more resource demanding (e.g., require highest amount of processing and/or memory) among the three receiver types. Similarly in terms of power consumption the receiver type A may consume least power and receiver type C may consume highest power among the three receiver types. Any of the receivers B and C may or may not be limited to handling interference of a certain type, e.g., from certain physical signals/channels. Examples of receiver type B and receiver type C are puncturing receiver and inter-cell interference cancellation receiver. In another example, receiver C is inter-cell interference cancellation receiver for mitigating the interference from reference signals (e.g., CRS). In yet another example, receiver C employs joint channel estimation when mitigating inter-cell interference. The related embodiments are described below:

The receiver selection may be based on one or more conditions. For example, according to one embodiment, the UE may select receiver type B if one or more of the following conditions are met (other additional conditions are not precluded):
    CP length of CP used in aggressor and target cells are different
    CP length of CP used in aggressor cell is longer than that of the target cell
    There is uncertainty regarding the CP length of aggressor cell (e.g., the information obtained by the UE is insufficient or non-ambiguous or the UE has not attempted to obtain the CP-related information or the UE is in a low-activity state; an example of the ambiguous CP length information may be "at least one neighbor cell is using a CP length longer (shorter) than a given (measured or serving) cell")
    The aggressor and target cells' signals do not overlap over all or over a subset of time- and/or frequency resources (e.g., reference signals in the aggressor cell are transmitted on different subcarriers than reference signals in the target measured cell; or synchronization or broadcast signals are transmitted at different time instances or subframes than the measured signals/channels in the target cell).
  According to another embodiment the UE may at least avoid selecting receiver type C if the CP length of CP used in aggressor is longer than that used in the target cell or at least it may select more often receiver type C in these conditions.
  According to another embodiment the UE may select receiver type C if the CP length of CP used in aggressor and target cells are the same. Receiver C may further to employ joint channel estimation for the aggressor and victim cell when the CP lengths are the same.
  According to another embodiment, the UE may select receiver type C if the CP length of CP used in aggressor cell is smaller than that used in the target cell.
  Any of the following additional factors in addition to the CP length may also be taken into account when adaptively configuring the enhanced receiver technique:
    Signal type since at least in some embodiments the CP configuration may apply to certain signal(s)/channel(s),
    Whether measured and/or aggressor cells are serving cell or not,
      In one example, if both are serving cells, different CP configurations may not be supported by the receiver, otherwise, different CP configurations may be allowed (see more details in Embodiment 5),
    Bandwidth (BW) (system BW, transmit BW, measurement BW) of the aggressor and/or target, e.g.:
      If BW of the measured cell is smaller than a threshold (e.g. 5 MHz) then UE preferably uses the type C receiver if the conditions are met (i.e. aggressor cell CP is the same as or smaller than that used in the target cell). This will help to improve the spectral efficiency i.e. higher date rate in a smaller BW. The power consumption is also lower when the BW is smaller.
  If bandwidth of the measured signal/channel or cell in general is smaller than that of the bandwidth of the aggressor signal/channel or cell in general receiver type C may be selected. Otherwise, e.g. puncturing on the overlapping BW may be applied and the estimation may be done on the rest of the bandwidth.

MBSFN configuration of the aggressor and/or target, e.g.:
  If MBSFN configuration is an implicit indication of the configured longer CP length or possibly configured longer CP length,
  If MBSFN configuration is an implicit indication of specific configuration of aggressor or victim signals (e.g., CRS are not transmitted in the data region of an MBSFN subframe)

Measurement pattern for measurements in the target cell, e.g.:
  The measurement pattern may be associated with a pre-defined or configured CP length,
  The measurement pattern may be configured for measurements on the signals/channels for which the receiver type is intended or capable to improve,
  The measurement pattern may be indicative of specific interference conditions in at least time and/or frequency resources indicated by the pattern (e.g. lower interference compared to other subframes not comprised in the measurement pattern such as with eICIC measurement patterns)

Transmit pattern for one or more signals/channels transmitted in the aggressor cell
  The transmit pattern may be associated with a pre-defined or configured CP length,
  The transmit pattern may be associated with the signals/channels transmissions the interference from which the receiver type is intended or capable to deal with Pattern for short-range communication, e.g., device-to-device or machine to machine communication Low-activity state (e.g., IDLE, Discontinuous Reception (DRX), etc.)
  In low activity state the UE uses type C receiver when the UE is certain that the aggressor cell CP is the same as (in one example) or not longer (in another example) than that used in the target cell. This is because the efficient utilization of the UE power consumption in low activity state is crucial. The receiver type C typically requires higher UE power consumption. If the DRX cycle is longer than a threshold (e.g. 640 ms) then the UE may even use receiver type A, irrespective of the CP length.

Level of synchronization between the aggressor and target cells
  When level of synchronization between the aggressor and target (i.e. victim or measured) cells is worse than a threshold (e.g. 3 μs between frame start timing of the aggressor and target cells) then regardless of CP lengths in the two cells, the UE does not use receiver type C but uses receiver type B or receiver type A. The information related to the level of synchronization between any sets of cells or in the network can be obtained by the UE autonomously (e.g. when searching cells), via information provided by the network node, stored information or historical data (e.g. past statistics or measurements), pre-defined information or rule (e.g. pre-defined synchronization level in the network or certain set of cells in a coverage area).

Interference conditions, e.g.:
  Signal quality of the measured cell, e.g.
    At a higher signal quality (e.g. Signal-to-Interference Ratio (SINR) above 3 dB) the UE may use receiver type A or B regardless of the CP lengths used in the aggressor and target cells. But at low SINR (e.g. below 0 dB) the UE uses the receiver type C provided the conditions for CP lengths are met (e.g. aggressor cell CP is the same as or smaller than that used in the target cell).
  Absolute received signal strength of the aggressor cell
  Relative received signal strength of the aggressor cell (e.g., with respect to the target cell or serving cell)

According to yet another aspect of this embodiment the UE may adapt its receiver type based on the determined radio conditions or radio characteristics of the aggressor cell(s). For example if the delay spread of the signal received from at least one aggressor cell is above a threshold (e.g. 3-4 μs) then the UE may use receiver type A or B. In another example if the delay spread of the signal received from at least one aggressor cell and the target measured cell are within a certain is threshold (e.g. 0.5 μs) then the UE may use receiver type C. In yet another example if the difference between the magnitudes of the delay spreads of the signals received from at least one aggressor cell and the target measured cell is larger than a threshold (e.g. 3 μs) then the UE may use receiver type B or receiver type A.

Embodiment 2

Methods of Determining CP Configuration of a Cell

Embodiments described in this section may be combined, at least in part, with embodiments described in other sections disclosed herein.

The CP configuration herein and other embodiments may comprise UL CP or DL CP configuration or both.

In order to adapt the receiver type for receiving or measuring signals in a measured cell the UE needs to know the CP length of the aggressor cell(s). The CP length of the measured cell becomes known to the UE when it searches (detects) this cell. The UE determines CP length of a cell when identifying a cell e.g. blind detection of CP. Either the cell identification is known (e.g. via assistance data) or not to the UE, the aggressor cell may still not be known to the UE i.e. the UE may not have searched and identified the aggressor cell. Therefore, the UE may not be aware of the CP length of the specific aggressor cell while it is receiving signals from a target measured cell which may be the serving cell or a neighbor cell. The received signal from the target measured cell is hit by the aggressor cell(s).

According to this mechanism, the CP length used in aggressor cell(s) can be determined by the UE or by another node. In the latter case the determined CP length is indicated to the UE:

explicit signaling to UE from another node,
collected radio measurement statistics,
combination of implicit signaling and collected radio measurement statistics.

These different mechanisms are described below.

Determining Aggressor Cell CP Length Based on Explicit Signaling

In this mechanism, in one example, the serving network node, for example, the first radio network node 514 in the event the first radio node 511 is the first wireless device 531, signals the CP length of the aggressor cell(s) to the UE, e.g., via RRC or a broadcast channel. The network, for example, network node 516, may, for example, send the CP length identifiers of the CP lengths used in aggressor cell(s) to the UE. If there are only two CP lengths possible (e.g. normal and extended CP) then the network may also indicate whether the aggressor cell and the reference cell have the same CP length or not. The reference cell is any cell known to the UE and therefore UE knows the CP length of that cell. For example, the reference cell can be the serving cell. In this case, for example, if the serving network node is the first radio network node 514 in the event the first radio node 511 is the first wireless device 531, the serving cell is the first cell 521. In another example, the reference cell is a neighbor cell which has been identified or to be identified or measured by the UE and its measurement result (e.g. RSRP) may also have been reported to the serving node over the last time period (T0; e.g. T0≤5 seconds).

The serving network node signaling the CP length information to the UE may determine the CP length of an aggressor cell by backhaul signaling (e.g. over X2 between eNBs). The CP length information via X2 may also be received during handover or when the neighbor information (aggressor and/or victim) is provided to the UE via another cell or node. A radio network node may also determine the CP length of a neighbor by using measurements or collected statistics performed by another radio node (e.g. by UE as explained in the next section).

A radio network node may also receive the CP length configuration of a neighbor via (another) UE, which in turn may either receive this information from the neighbor via explicit signaling from the neighbor or determine this configuration (e.g., by reading system information; see also Embodiment 3) or acquire this information from the UE's memory.

In another example, a radio network node may also be capable of receiving DL signals, hence the example above applies too.

Although the example above is more focused on the scenario when the receiving node is a wireless device receiving DL signals, the embodiments may also be adapted for UL. For example, the UL CP configuration may be obtained by a radio network node from another radio network node via X2 or via O&M or even via another UE.

Determining Aggressor Cell CP Configuration Based on Collected Statistics

According to this embodiment the method of determining the CP configuration (e.g., CP length) used by the aggressor radio nodes is in turn based on the measurements related to the radio characteristics of the aggressor cell. This method of determining the CP may be implemented in
 a measuring node (e.g., UE or radio network node),
 a node configuring measurements (e.g., eNodeB or other network node),
 a node configuring transmissions (e.g., eNodeB).

The aggressor may be any transmitting radio node (e.g., a UE or a radio network node). Some examples are:
 a node associated with a certain cell (e.g., a cell with a Pre-defined Cell Identification or PCI), or
 a node or a cell of a known type (e.g., a CSG cell or a macro BS),
 a neighbor transmitter (e.g., determined by a distance).

The aggressor may be
 Determined based on a pre-defined rule (e.g., based on a PCI relation),
 Autonomously determined by the node implementing the methods of determining the aggressor interferer characteristics,
 Indicated by another node (e.g., received in assistance data from a serving node).

The statistics may be based on measurements (performed by the determining node or received from UEs or other network nodes) and/or data (e.g., location information or received statistics from at least one other node). For example the measuring node may predict a signal configuration (e.g., CP length) based on the at least one radio characteristic of signals transmitted by the interfering cell (e.g., delay spread or multipath power delay profile or multipath delay, Doppler frequency). The measured signals can be compared with a threshold to determine the CP length used in a cell. For example if the delay spread of the signal received is above a threshold (e.g. 3-4 µs) then the measuring node may assume that extended CP length is used otherwise normal CP length is used in that cell. The additional aspects such as direction of arrival of signals, location of measuring node with respect to the cell on which measurements are performed may also be considered to further enhance the accuracy in determining the CP length of that cell.

Some example measurements: measurements indicative of multipath profile, timing measurements, received signal strength measurements, received signal quality measurements, CSI measurements (e.g., Channel Quality Indicator (CQI) or Precoding Matrix Indicator (PMI)), pathloss measurements, power headroom measurements, signal orthogonality measures, Angle-of-Arrival (AoA) measurements, positioning measurements, MDT measurements, Layer 2 measurements (e.g., packet delay, packet loss statistics (e.g., packet Uu loss rate). The measurements may be intra-frequency, inter-frequency, inter-RAT or CA measurements. Inter-RAT measurements may particularly be useful with multi-RAT BSs (e.g., Multi-Standard Radio (MSR)) when multiple RATs are co-located.

Example data: receiver location information, transmitter location information, information received in HandOver (HO) command, environment type indication (e.g., "bad" or "rich multipath").

The following information may also be used:
 Duplex information or any information indicative of channel reciprocity (e.g., for DL and UL transmissions in TDD),
 the information on whether DL and UL cells are the same/co-located or different (e.g., when shared cell is configured or when repeaters are used in one direction),
 the information about collocation of the antenna ports (e.g., multiple transmit ports or multiple receive ports).

Determining Aggressor Cell CP Configuration Based on Implicit Information and Collected Statistics According to this method a receiving/measuring radio node obtains (e.g., from a network node) a limited information regarding the CP configuration used by the aggressor radio node.

For example, the serving cell may indicate that the serving cell and neighbor cells have different CP length; this information is known in prior art. In another example the serving cell may indicate that the reference cell and neighbor cells have different CP length. The UE knows the CP length of the serving cell and the reference cell. The aggressor cell is one of the neighbor cells. But all neighbor cells may or may not have the same CP length as that used in the serving cell or reference cell. The UE therefore further use statistics (e.g., as described in section entitled "Determining aggressor cell CP configuration based on collected statistics") to verify whether the aggressor cell CP length is the same as that of the serving cell or the reference cell.

In another example, the measuring node may also be indicated environment type (e.g., "rich multipath" or "bad environment"). The environment type may be further associated with a certain CP configuration or may be determined based on a pre-defined rule or using the collected measurements or statistics.

Embodiment 3

Methods of Signaling CP Configuration Information to Other Nodes for Network Operational Tasks Embodiments described in this section may be combined, at least in part, with other embodiments described herein.

The CP configuration herein and other embodiments may comprise UL CP or DL CP configuration or both.

The receiving/measuring node may signal the information related to the determined CP configuration of aggressor radio node(s) or of any neighboring radio node to another network node, which may use the received information for one or more radio operational tasks. The radio node may also provide information or statistics related to the adaptation of its receiver types depending upon the CP configuration used in aggressor radio nodes. The statistics may be as e.g. described in the section entitled "Determining aggressor cell CP configuration based on collected statistics". In one example, the information may be provided for all serving cells in multi-cell scenarios e.g. in CA, CoMP, etc.

Examples of network operational tasks are adaptation of CP configuration in one or more radio nodes in the network (e.g., changing the CP configuration), adjustment or tuning of radio network parameters e.g. output power of radio network nodes, bandwidth of radio network nodes, etc. Examples of other nodes are eNodeB, relay, radio base station, network controller, SON node, MDT node, O&M, OSS node, positioning node, core network node, coordinating node, etc.

Hence, according to some embodiments herein, the network node may optimize (statically, semi-statically or dynamically) its CP configuration based on the collected information about neighbor cell or collected statistics or upon indication or request from one or more UEs or network nodes (e.g., neighbor eNodeBs or coordinating node).

A new radio network node in the network may also configure its CP based on the CP configuration information from at least one of its neighbors (e.g., use the same CP as the neighbor, at least under some conditions) or from a coordination node.

The methods of signaling of CP configuration information and some examples of its use by other nodes for network operational tasks are elaborated below:

Signaling of the Determined CP Configuration or the Information Indicative of a Preferred CP Configuration to a Network Node According to this embodiment the determined CP length of a neighbor radio node (e.g., according to any of the methods described in sections entitled "Determining aggressor cell CP length based on explicit signalling", "Determining aggressor cell CP configuration based on collected statistics", and "Determining aggressor cell CP configuration based on implicit information and collected statistics") may be signaled to the network node by the measuring node (e.g. by UE to its serving node). The measuring/receiving radio node may also provide an indication whether the currently used CP configuration in a certain cell (e.g. aggressor cell) is feasible from the measuring/receiving radio node's receiver performance perspective or not. The UE may also collect and provide statistics when the delay spread exceeds the CP length or alert to a network node that the current CP configuration is not optimal (e.g., a statistical measure of a delay spread or multipath is verified versus a condition and the alert is triggered when the condition does not hold).

For example, consider a UE determines that in neighbor cells with cell ID #10 and cell ID #20, which are the two strongest interferes, normal CP length is used. However due to the radio characteristics of the two cells (e.g. very large multipath delay in order of 3-4 µs) the UE reception performance when using advanced antennas can be enhanced provided extended CP is used in these cells. Therefore UE sends the recommended CP length and optionally the reason (e.g. due to large delay spread) to the serving node. The network node may further forward this information to other nodes (e.g. neighboring eNodeBs over X2), which may change the CP length.

Adaptation of CP Lengths in Neighboring Radio Nodes

The receiving network node, that is the network node receiving the information signalled as described in the previous section, or the other nodes may also collect statistics from other users and may modify the CP length in certain cells based on statistics. For example the CP length recommended for certain cell by at least X % of the users may be configured by the network node. The network may also adjust the CP length in other surrounding cells which have similar radio characteristics (e.g. delay spread or multipath delay profile) as that of the recommended cell(s).

Obtaining CP Configuration for Positioning

This embodiment may be a standalone embodiment, independent of other embodiments described in other sections, but it may also be combined with any of the other embodiments, e.g., the receiver's ability to adapt to CP configuration of the aggressor radio node or the relationship of the measured node and the aggressor node.

According to the current standard, only CP configuration of PRS signals may be provided to the positioning node by eNodeB via LPPa. However, positioning may be performed based on measurements performed on other DL signals, e.g., CRS. Further, the existing CP configuration signaling for positioning does not account that radio nodes associated with signals used for positioning (e.g. PRS) may be different from radio nodes associated with normal data transmissions, e.g., radio beacons may be used for transmitting PRS and radio beacons may be more densely installed than radio base stations, and hence different CP configurations may be justified too.

Currently, the CP configuration of CRS is not known to the positioning node, only PRS CP is known, and it is an assumption in prior art that the CP configuration is the same for PRS and other signals. The need for the CP configuration of CRS is also not straightforward because the standard positioning measurements are performed in positioning subframes which contain PRS signals and CRS transmitted in the same subframes have the same CP configuration as PRS.

Hence, in one of the embodiments, positioning node (e.g., E-SMLC in LTE) obtains the CP configuration related to signals other than PRS (e.g., CRS, DM-RS, CSI-RS, MBSFN reference signals, etc.). This information may be acquired or pro-actively provided by eNodeB via LPPa. The information may also be associated with a specific signal, e.g.,

- via explicit indication of the signal(s) or subframe types (note that the UE is currently not aware of the cell-specific MBSFN configuration), or
- indicating whether the same or different configuration applies for different signals, or
- the signal type is indicated in the request from the positioning node.

In another embodiment, positioning node obtains this cell information from another network node (e.g., MME, SON or O&M). In yet another embodiment, the positioning node obtains this information from a UE or via (transparently) a UE or determines/predicts the CP configuration of a cell based on the collected measurements and/or data, as described in other embodiments.

The CP configuration for signals other than PRS may also be provided to the UE, e.g., via LPP protocol. The CP configuration may be associated with a signal, e.g., via explicit indication of the signal(s) or subframe type; or via indicating whether the same or different configuration applies for different signals; it may also be indicated whether the configuration is the same or not as in the reference cell (e.g. for the same signal type).

In yet another example, there may be a pre-defined rule based on which the UE may assume that the PRS CP configuration is the same as CP configuration of other signals in the cell.

The CP configuration in this section may be the CP configuration of any cell. In fact, any cell may be interpreted as an aggressor cell with respect to at least one of its neighbors, at least in some part of the cell.

The new way of signaling may be used e.g. when either the positioning node or the UE have a possibility to choose the signal for measurements and the correct CP configuration. The CP configuration of multiple signals thus becomes known to at least positioning node (currently it is only PRS CP which may be known). Positioning node or UE may also determine the CP configuration of other physical signals than PRS (e.g., CRS) using other embodiments, e.g., a described in Embodiment 2.

Embodiment 4

Signaling of Capability Information Associated with Receiver Type Adaptability Depending upon CP Configuration All receiving/measuring nodes may not be capable of adapting its receiver type responsive to the CP configuration of the aggressor node or a relationship between the CP configuration of the CP used in aggressor cell(s) and the target measured cell.

According to this embodiment the radio node (e.g., wireless device or eNodeB) may report its capability to a network node (e.g. serving radio node, core network node, positioning node, etc) or another radio node (e.g., eNodeB or wireless device) that it is capable of adapting its receiver type responsive to the CP configuration of the aggressor cell or the CP configuration in the aggressor and target radio node(s).

This capability may also be comprised in a more general capability, e.g., all UEs supporting receiver type C for the purpose of inter-cell interference coordination, are capable of adapting its receiver to the CP length of the aggressor and measured cells. In another example, all UEs capable of performing measurement in restricted measurement subframes and receiving assistance data from a network node comprising the aggressor cell information, should be capable of adapting its receiver to the CP configuration of the aggressor and measured cells. In yet another example, all UEs supporting multi-tag tag transmissions/receptions (e.g., CA, DL CoMP or UL CoMP) may also support adaptive receiver responsive to CP configuration of an aggressor radio node or the relation between the CP configuration of a target node and aggressor node.

Different requirements may apply for radio nodes capable and not capable to adapt its receiver to the aggressor and measured radio node(s). Some examples of the requirements are cell identification or RLM requirements. The requirements may differ e.g. in the required measurement period or accuracy, depending on this UE capability.

Additional Information Associated with UE Capability

The capability information may contain additional information. Examples of additional information are any combination of:

- The type of receivers which can be adapted. For example a UE may indicate that it can adapt between all its receiver types. In another example a UE may indicated that it can adapt between any three receiver types A, B and C. In yet another example a UE may indicated that it can adapt between any receiver types B and C.
- Physical channels for which adaptation can be done. For example a UE may indicate that it may adapt its receivers or certain types of receivers for receiving data channel (e.g. PDSCH). In another example a UE may indicate that it may adapt its receivers or certain types of receivers for receiving certain physical signals (e.g. CRS, Primary Synchronization Signal/Secondary Synchronization Sequence (PSS/SSS), PRS, CSI-Reference Signal (CSI-RS), DeModulation Reference Signal (DM-RS) or UE specific Reference Signal (RS) etc).
- Whether UE can apply receiver adaptation based on CP length of aggressor cell(s) in single carrier operation, multicarrier operation, CoMP scenario, combined CoMP and multi-carrier operation etc. It may further indicate:
  - The number of serving cells in multi-carrier and/or CoMP on which the UE can adapt its receiver types when receiving cells from these cells at the same time.
  - The number of aggressor cells which can be considered when adapting the receiver type based on aggressor cells' CP length.
- For receiver adaptation whether the UE can detect the CP length of an aggressor cell:
  1. Itself without any assistance. For example UE may implicitly determine the CP length by the virtue of the radio conditions as described earlier.
  2. Needs at least implicit assistance information. Examples of implicit assistance information are: indication whether MBSFN is used in aggressor cell(s) or neighbor cells, MBSFN configuration in aggressor cell(s) or neighbor cells, indication or information related to radio environment of aggressor cell(s).
  3. Needs explicit assistance information. Examples of explicit assistance information are: an explicit indication about the CP length used in aggressor cell, whether CP length in aggressor cell and a known reference cell is the same or different; reference cell can be a serving cell or a known neighbour cell.

Radio Node Capability Reporting Mechanisms

The radio node (e.g., wireless device or eNodeB) may send the capability information to the network node in any of the following manner:

Proactive reporting without receiving any explicit request from the network node (e.g. serving or any target network node or coordinating node)

Reporting upon receiving any explicit request from the network node (e.g. serving or any target network node)

The explicit request can be sent to the UE by the network anytime or at any specific occasion. For example the request for the capability reporting can be sent to the UE during initial setup or after a cell change (e.g. handover, RRC connection re-establishment, RRC connection release with redirection, PCell change in CA, PCC change in PCC etc).

In case of proactive reporting the UE may report its capability during one or more of the following occasions:

During initial setup or call setup e.g. when establishing the RRC connection

During cell change e.g. handover, primary carrier change in multi-carrier operation, PCell change in multi-carrier operation, RRC re-establishment, RRC connection release with redirection etc.

Use of Received Capability Information for Network Operational Tasks

The network node receiving the capability uses the received capability information for various network operational tasks. According to one example the capability information received by the network node may be signaled to another node, e.g., to another UE in Device to Device (D2D) communication mode, radio network node, core network node, positioning node. These nodes may use this information for example after cell change. Therefore the UE may not have to again signal its capability to the network. Yet another example of network operation task is to decide whether to send assistance information to the UE and in that case the type of assistance information. The network may also decide to update the CP length used in different cells in the network depending upon the statistics of the users which are capable of adapting their receiver types based on CP length.

Embodiment 5

Multi-Leg Transmissions and Aggressor Interference Handling

Embodiments in this section may be considered independent from other embodiments in other sections or may be combined in any combination with other embodiments, e.g., with Embodiment 1 or embodiments 2-4.

No restriction on transmission configuration or receiver assumption provides more flexibility, whilst may lead to a higher complexity.

Less complexity and fewer procedures are typically needed for serving cell transmissions, e.g., channel estimation for aggressor interference handling may not need to be same accurate as for serving cell transmissions with precoding and demodulation may be not needed at all for handling the aggressor interference. Hence, as a trade-off, this part of the invention suggests that the radio node can make independent assumptions regarding the receiver used for the reception of the multi-serving cell/multi-leg transmissions and for handling the aggressor node interference or adjust the received according to a pre-defined rule.

For example, the radio node (e.g., UE or eNodeB) may adapt or use different receiver types for receiving signals from serving cells/links in multi-leg compared to that used for assessing or handling interference from aggressor node(s). The radio node may also adapt its receiver differently in at least 2 out of 3 cases: when the victim and aggressor are serving cells/links, when the victim and aggressor are non-serving cells/links, and when one of the victim and aggressor is serving cell/link and another one is non-serving.

In one embodiment, the same CP length may be assumed for multi-leg (aka multi-link, multi-cell, multi-serving cell, multi-radio link, etc) transmissions or transmissions from multiple serving cells, e.g., DL CoMP or UL CoMP, whilst different CP lengths in an aggressor cell and victim cell may still be possible to handle by enhanced receivers where at least one of the links is a non-serving link. The latter may also depend on an additional condition, e.g., different CP lengths may be possible if the cell bandwidth (aggressor's, target's, or both) does not exceed a certain threshold (see Embodiment 1 for more condition examples). This is because performing measurements or estimating the channel for the purpose of interference coordination over links with different CP length may be less demanding than serving the data over such links. Example configurations are illustrated below.

1. a method in the receiver (UE or radio network node) comprising the receiver adaptively using the same CP configuration for multi-leg transmissions but different CP configurations when at least one of the measured cell and aggressor cell is a non-serving cell. There may also be pre-defined rule allowing the receiver to assume the same CP configuration for multi-leg transmissions but different CP configurations when at least one of the measured cell and aggressor cell are non-serving cells.

2.=>a method in a network node (e.g., radio network node or coordinating node or positioning node) of configuring transmissions and/or measurements and/or deciding a set of serving cells comprising the network node adaptively deciding to use the same CP configuration for multi-leg transmissions but different CP configurations may be configured for a measured cell and aggressor cell. There may also be a pre-defined rule according to which the receiver should not expect different CP configurations for multi-leg transmissions but may expect that different CP configurations may also happen when at least one of the measured cell and aggressor cell are non-serving cells. Such rules may be determined e.g. by requirements specified for the same CP configuration for multi-tag transmissions and specified in a generic way (i.e., allowing for different CP configurations) when at least one of the aggressor and measured links are non-serving links. Such pre-defined rules may thus impose also how the links are selected and how CP is configured, which may also depend on the receiver capability to adapt its receiver to different CPs.

The possibility for using the same CP may further be used as a basis for configuring the same FFT for multi-leg transmissions (which simplifies the receiver), whilst different FFTs may still be used for assessing the aggressor cell interference and the target cell (non-serving cell) transmission (i.e., when different CP configurations are allowed according to some embodiments)

Different CP configuration may also be assumed by receiver/used by the network, depending on the measurement bandwidth or transmission bandwidth or system bandwidth, e.g., when the aggressor transmissions are over a bandwidth not exceeding a pre-defined threshold or over a bandwidth not larger than a serving cell bandwidth or a maximum bandwidth of a set or a subset of multiple serving cells.

Multi-leg transmissions may be on the same or different carrier frequencies, i.e., may be intra-frequency, inter-frequency, CA transmissions, or any combination thereof.

Figure 3:
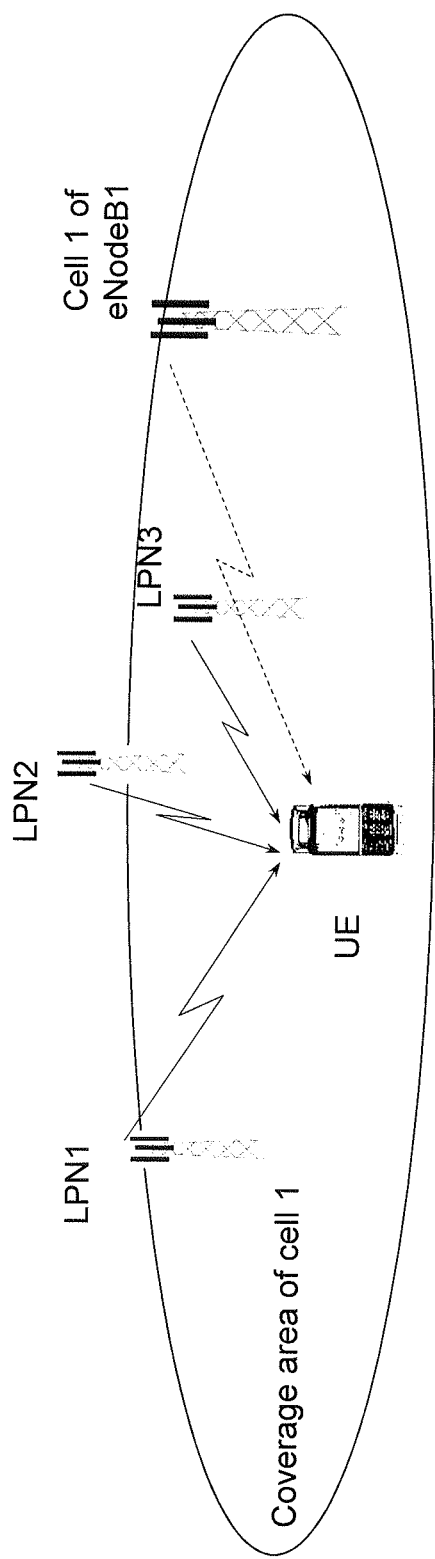
FIG. 3 illustrates an example interference scenario.

FIG. 3, illustrates an example scenario with multi-leg DL transmissions in a heterogeneous environment: UE receives DL CoMP transmissions from low-power nodes (LPNs) 1, 2 and 3, being also subject to aggressor interference from cell 1 (e.g. a large macro cell), where the LPNs may be configured with normal CP and the aggressor cell may be configured with an extended CP.

Figure 4:
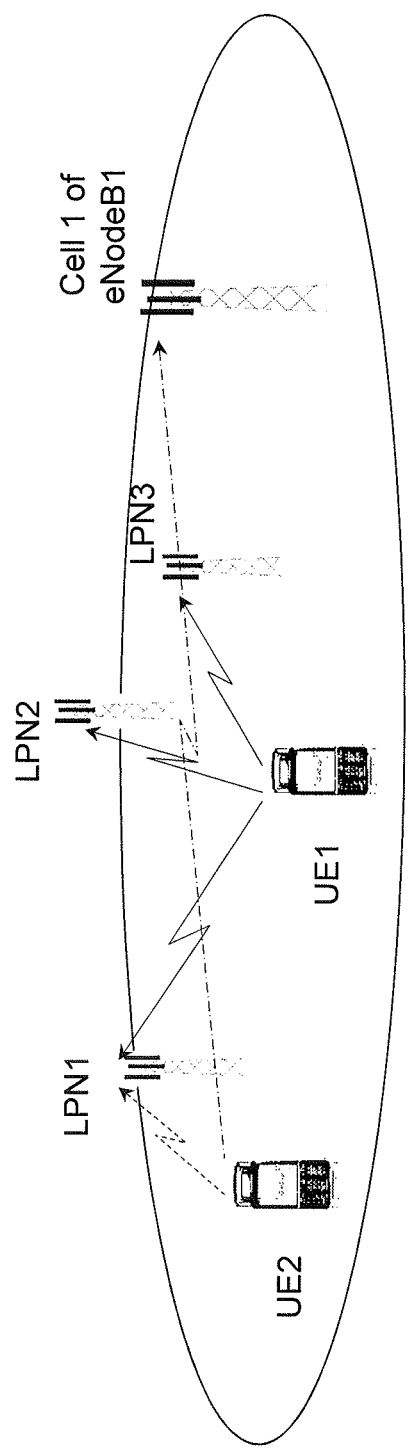
FIG. 4 illustrates another example interference scenario.

FIG. 4, illustrates an example scenario with multi-leg UL transmissions in a heterogeneous environment: LPNs 1, 2 and 3 receive UL CoMP transmissions from UE1, where LPN1 is subject to high UL interference from an aggressor UE2 served by Cell 1 of eNodeB1, and the UE1 transmission may be with a CP length shorter than that of the UE2 transmission. The enhanced receiver in this example may be in LPN1 and the LPNs may be pico BSs or CSG femto BSs.

Various embodiments disclosed herein may provide one or more of the potential advantages listed below:

Signalling circuitry or means may increase the measuring radio nodes' and other network nodes' awareness about the CP configuration in other radio nodes as well as collecting statistics to facilitate optimizing CP configuration in radio network nodes.

The measuring radio node may be able to select the most appropriate receiver type when receiving signals from a measured radio node when the received signal is interfered by at least one aggressor radio node. This leads to the following benefits:

The radio node's receiver performance is enhanced under dominant aggressor cell interference.

On the average the radio node's power consumption is reduced.

On the average the radio node's processing is decreased in relation to the received data rate.

The network may use a radio node's reported statistics to improve the network planning and tune network operational parameters to facilitate (same or different) radio node's receiver adaptation.

Radio network nodes may adapt its CP configuration to align with that used in a neighbor cell, based on the received information related to the CP configuration in the neighbor nodes or based on the UE statistics.

Rules for selecting serving cells for a multi-leg communication (e.g., CA, CoMP) responsive to the cells' CP configurations.

Rules for (re)configuring CP of multi-leg links (e.g. CA, CoMP).

Abbreviations:
3GPP 3$^{rd}$ Generation Partnership Project
BS Base Station
CP Cyclic Prefix
CRS Cell-specific Reference Signal
DL Downlink
eNodeB evolved Node B
E-SM LC Evolved SM LC
IE Information Element
LTE Long-Term Evolution
MDT Minimization of Drive Tests
PCI Physical Cell Identity
RF Radio Frequency
RRC Radio Resource Control
RSRP Reference Signal Received Power
RSRQ Reference Signal Received Quality
RSSI Received Signal Strength Indicator
SINR Signal-to-Interference Ratio
SON Self-Optimized Network
SRS Sounding Reference Signals
UE User Equipment
UL Uplink
UMTS Universal Mobile Telecommunications System
UTDOA UL Time Difference of Arrival In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification shall support claims to any such combination or subcombination.

The invention claimed is:

1. A method in a first radio node for adapting a receiver type in the first radio node, the first radio node comprising a first receiver type and a second receiver type, the two receiver types being different, and the first radio node being comprised in a wireless communications network, the wireless communications network further comprising a second radio node and at least one third radio node, the method comprising:
   determining a Cyclic Prefix, CP, length of at least one radio signal transmitted by the second radio node, and a CP length of at least one radio signal transmitted by the at least one third radio node; and
   adapting in the first radio node, the receiver type to be one of the first receiver type and the second receiver type, based on a relation between the CP length of the radio signal transmitted by the second radio node and the CP length of the radio signal transmitted by the third radio node,
   wherein the first radio node is unaware of the CP length of the at least one radio signal transmitted by the at least one third radio node when the first radio node receives the at least one radio signal from the second radio node,
   wherein the first receiver type is a first type of enhanced receiver of the first radio node configured to utilize a first technique for mitigating interference of the wireless communication network, and
   wherein the second receiver type is a second type of enhanced receiver of the first radio node configured to utilize a second technique, different from the first technique, for mitigating interference of the wireless communication network.

2. The method of claim 1, wherein the adapting is performed when the first radio node receives signals from the second radio node, wherein the signals are interfered by the at least one third radio node.

3. The method according to claim 1, wherein the at least one third radio node comprises an aggressor node that has not been searched and identified by the first radio node, wherein the determining the CP length of the at least one radio signal transmitted by the at least one third radio node is based on at least one of: received information on the CP length of the at least one radio signal transmitted by the at least one third radio node, radio characteristics of the at least one third radio node, and radio measurements.

4. The method according to claim 1, wherein the first receiver type is not capable of mitigating interference caused by the at least one third radio node or is capable of mitigating the interference, provided the interference from the at least one third radio node is below a threshold, and the second receiver type is capable of mitigating interference caused by the at least one third radio node.

5. The method according to claim 1, further comprising:
   selecting the second receiver type responsive to a determination that the CP length of the at least one radio signal transmitted by the at least one third radio node is smaller than the CI length of the at least one radio signal transmitted by the second radio node; and
   selecting the second receiver type responsive to a determination that the CP length of the at least one radio signal transmitted by the at least one third radio node and the CP length of the at least one radio signal transmitted by the second radio node are the same.

6. The method according to claim 1, the method further comprising signalling to a node comprised in the wireless communications network, the node being different from the first radio node, at least one of:
   information related to the determined CP length of the at least one radio signal transmitted by one of: the at least one third radio node and the second radio node, and
   a capability of the first radio node for adapting the receiver type depending on the CP length of the at least one radio signal transmitted by the second radio node and the CP length of the at least one radio signal transmitted by the at least one third radio node.

7. The method of claim 6, wherein the node is a positioning node.

8. The method of claim 2, wherein the signals from the second radio node are interfered by the at least one third radio node, and wherein the adapting is further based on at least one of: type of the signals, whether the second radio node and the at least one third radio node are associated with serving cells of the first radio node, bandwidth of one of: the second radio node and the third radio node, Multicast-Broadcast Single Frequency Network configuration of one of the second radio node and the at least one third radio node, measurement pattern for measurements in the second radio node, transmit pattern for one or more signals/channels transmitted in the at least one third radio node, pattern for short-range communication, low-activity state, level of synchronization between the second radio node and the at least one third radio node, interference conditions, and one of radio conditions and radio characteristics of the at least one third radio node.

9. The method of claim 1, wherein transmissions by the second radio node and transmissions by the at least one third radio node comprise a multi-leg transmission, wherein the multi-leg transmission comprises transmissions from multiple serving cells or radio links.

10. A first radio node for adapting a receiver type in the first radio node, the first radio node comprising a first receiver type and a second receiver typo, the two receiver types being different, and the first radio node being adapted to be comprised in a wireless communications network, the wireless communications network further being adapted to comprise a second radio node and at least one third radio node, the first radio node comprising:
   a determining circuit configured to determine a Cyclic Prefix, CP, length of at least one radio signal to be transmitted by the second radio node, and a CP length of at least one radio signal to be transmitted by the at least one third radio node; and
   an adapting circuit configured to adapt in the first radio node, the receiver type to be one of the first receiver type and the second receiver type, based on a relation between the CP length of the radio signal to be transmitted by the second radio node and the CP length of the radio signal to be transmitted by the third radio node,
   wherein the CP length of the at least one radio signal transmitted by the at least one third radio node is not indicated to the first radio node when the first radio node receives the at least one radio signal transmitted by the second radio node,
   wherein the first receiver type is a first type of enhanced receiver of the first radio node configured to utilize a first technique for mitigating interference of the wireless communication network, and
   wherein the second receiver type is a second type of enhanced receiver of the first radio node configured to utilize a second technique, different from the first technique, for mitigating interference of the wireless communication network.

11. The first radio node of claim 10, wherein the adapting circuit is configured to adapt when the first radio node receives signals from the second radio node, wherein the signals are interfered by the at least one third radio node.

12. The first radio node of claim 10, wherein the at least one third radio node comprises an aggressor node that has not been searched and identified by the first radio node, and wherein the determining circuit is configured to determine based on at least one of received information on the CP length of the at least one radio signal to be transmitted by the at least one third radio node, radio characteristics of the at least one third radio node, and radio measurements.

13. The first radio node of claim 10, wherein the first receiver type is not capable of mitigating interference caused by the at least one third radio node or is capable of mitigating the interference, provided the interference from the at least one third radio node is below a threshold, and the second receiver type is capable of mitigating interference caused by the at least one third radio node.

14. The first radio node of claim 10, wherein the adapting circuit is further configured to:
   select the second receiver type responsive to a determination that the CP length of the at least one radio signal to be transmitted by the at least one third radio node is smaller than the CP length of the at least one radio signal to be transmitted by the second radio node; and
   select the second receiver type responsive to a determination that the CP length of the at least one radio signal to be transmitted by the at least one third radio node and the CP length of the at least one radio signal to be transmitted by the second radio node are the same.

15. The first radio node of claim 10, further comprising a signalling circuit configured to signal to a node adapted to be comprised in the wireless communications network, the node being different from the first radio node, at least one of:
   information related to the determined CP length of the at least one radio signal to be transmitted by one of the at least one third radio node and the second radio node, and
   a capability of the first radio node for adapting the receiver type depending on the CP length of the at least one radio signal to be transmitted by the second radio node and the CP length of the at least one radio signal to be transmitted by the at least one third radio node.

16. The first radio node of claim 10, wherein the node is a positioning node.

17. The first radio node of claim 11, wherein the adapting circuit is further configured to adapt, when the signals to be transmitted from the second radio node are interfered by the at least one third radio node, based on at least one of; type of the signals, whether the second radio node and the at least one third radio node are associated with serving cells of the first radio node, bandwidth of one of the second radio node and the third radio node, Multicast-Broadcast Single Frequency Network configuration of one of: the second radio node and the at least one third radio node, measurement pattern for measurements in the second radio node, transmit pattern for one or more signals/channels to be transmitted in the at least one third radio node, pattern for short-range communication, low-activity state, level of synchronization between the second radio node and the at least one third radio node, interference conditions, and one of radio conditions and radio characteristics of the at least one third radio node.

18. The first radio node of claim 10, wherein transmissions to be transmitted by the second radio node and transmissions to be transmitted by the at least one third radio node comprise a multi-leg transmission, wherein the multi-leg transmission comprises transmissions from multiple serving cells or radio links.

19. The method according to claim 4, wherein the radio signals transmitted by the second and third radio nodes do not overlap over a subset of frequency resources.

20. The method according to claim 19, wherein the second receiver type comprises one of a puncturing receiver and an inter-cell interference cancellation receiver having a higher power consumption than the first receiver type.

* * * * *